(12) United States Patent
Hou

(10) Patent No.: US 8,146,892 B2
(45) Date of Patent: Apr. 3, 2012

(54) WATERFALL DECORATIVE HUMIDIFIER

(75) Inventor: Jack Hou, Sterling, VA (US)

(73) Assignee: Giftec Ltd, Sterling, VA (US)

( * ) Notice: Subject to any disclaimer, the term of this patent is extended or adjusted under 35 U.S.C. 154(b) by 790 days.

(21) Appl. No.: 12/232,397

(22) Filed: Sep. 17, 2008

(65) Prior Publication Data

US 2009/0250529 A1 Oct. 8, 2009

Related U.S. Application Data

(63) Continuation-in-part of application No. 12/078,815, filed on Apr. 7, 2008.

(30) Foreign Application Priority Data

May 21, 2008 (CN) .......................... 2008 1 0067324
Aug. 8, 2008 (CN) .......................... 2008 1 0142312

(51) Int. Cl.
*B05B 17/08* (2006.01)
*B01F 3/04* (2006.01)

(52) U.S. Cl. ................. 261/75; 239/17; 239/20; 239/23
(58) Field of Classification Search .................. 261/75; 239/17, 20, 23
See application file for complete search history.

(56) References Cited

U.S. PATENT DOCUMENTS 6,527,257 B1 * 3/2003 Schuld ........................... 261/29
* cited by examiner

*Primary Examiner* — Robert A Hopkins

(57) ABSTRACT

A waterfall decorative humidifier, including mainly a housing, a water exit on top of the housing, a water sub-receptacle in the lower portion of the housing, a water pump in the water sub-receptacle, and a fan in the housing; in which the water pump is connected with the water exit through a water pipe, and in which the housing is generally of the shape of a waterfall; wherein at least one shaft is provided on the housing, and a decoration is connected to the shaft directly or through a mechanism.

15 Claims, 24 Drawing Sheets

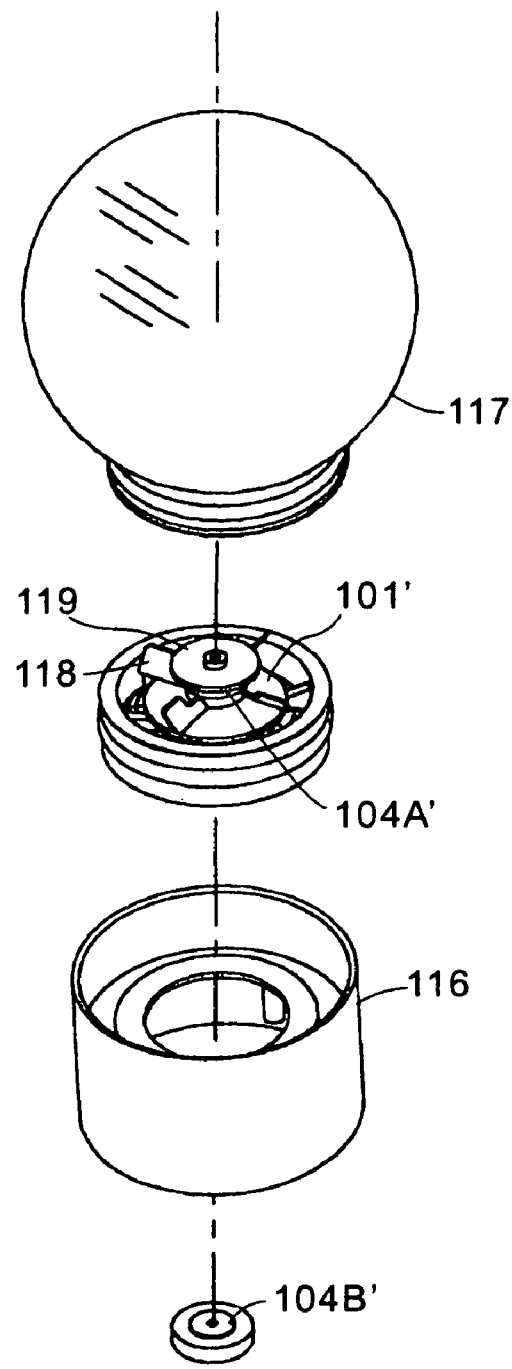
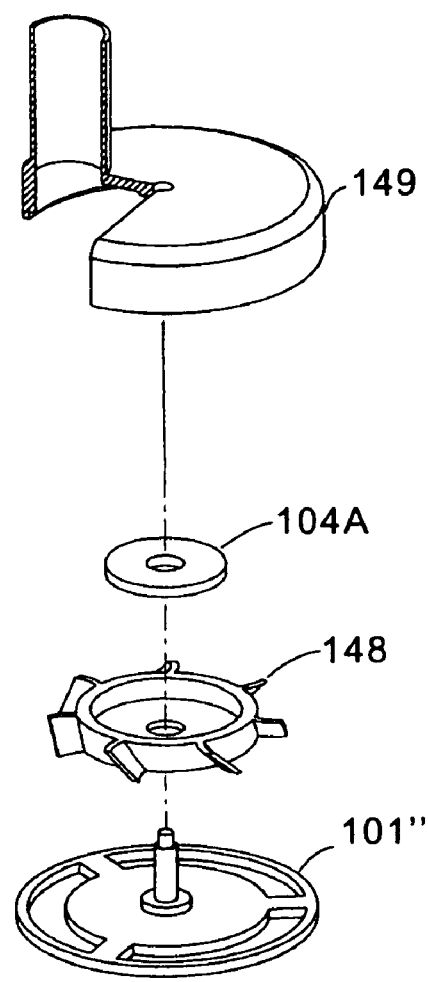
FIG 14
FIG 15

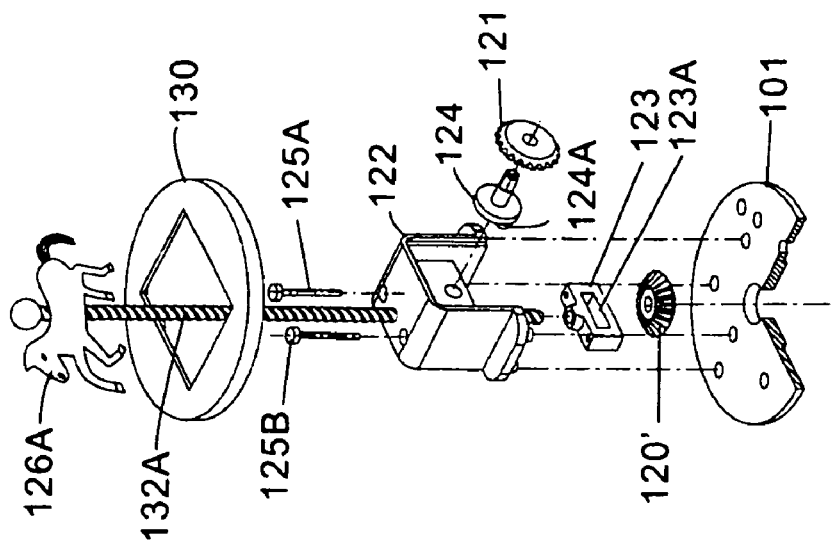
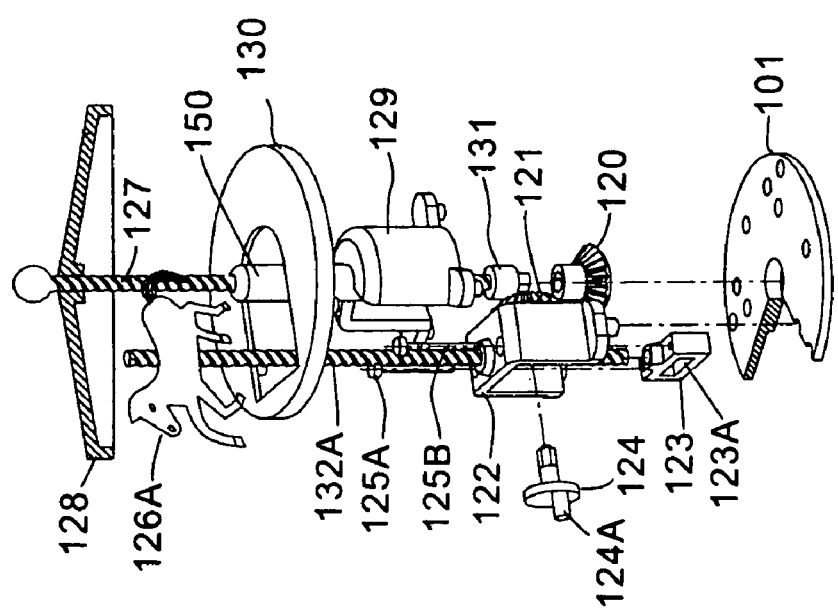
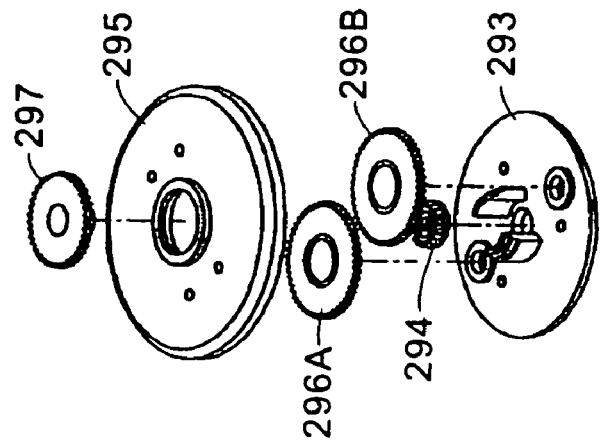

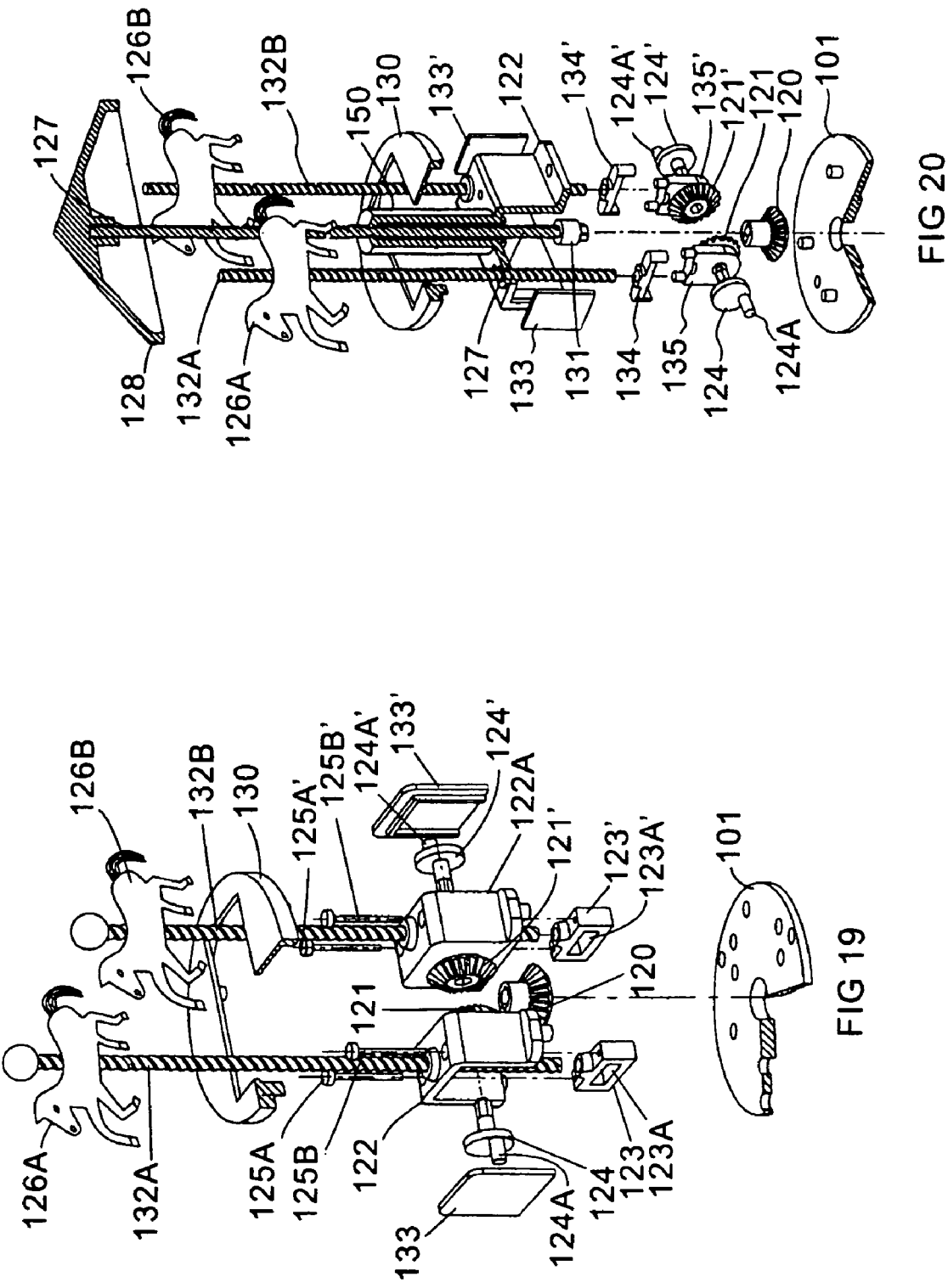

WATERFALL DECORATIVE HUMIDIFIER

CROSS REFERENCE OF THE RELATED APPLICATION

This application is a CIP application of the application of Ser. No. 12/078,815, filed on Apr. 7, 2008, entitled "decorative humidifier," now pending.

FIELD OF THE INVENTION

This invention relates to a humidifier, in particular to a humidifier that can provide a function of decoration.

BACKGROUND OF THE INVENTION

The conventional humidifiers mostly serve the purpose of humidifying the air or the rooms, and are rarely being decorative.

Various examples of conventional humidifiers or decorative structures are listed in the information disclosure statement.

SUMMARY OF THE INVENTION

The present invention relates to a humidifier that can provide a function of decoration, and filtering.

Furthermore, the humidifier of the present invention can provide not only vapor, but also ozone to the air or the rooms, and various embodiments of decorations, most of them involve some subassembly or moving mechanisms, can be used in this invention.

The decorative humidifier of the present invention can also be served as a decoration having waterfalls.

BRIEF DESCRIPTION OF THE DRAWINGS

FIGS. 13, 14, . . . , 27, and 28 illustrate a first, second, . . . , fifteenth, and sixteenth subassembly, respectively, than can be used with the embodiments shown in FIGS. 1-5.

DETAILED DESCRIPTION OF THE INVENTION

Figure 1:
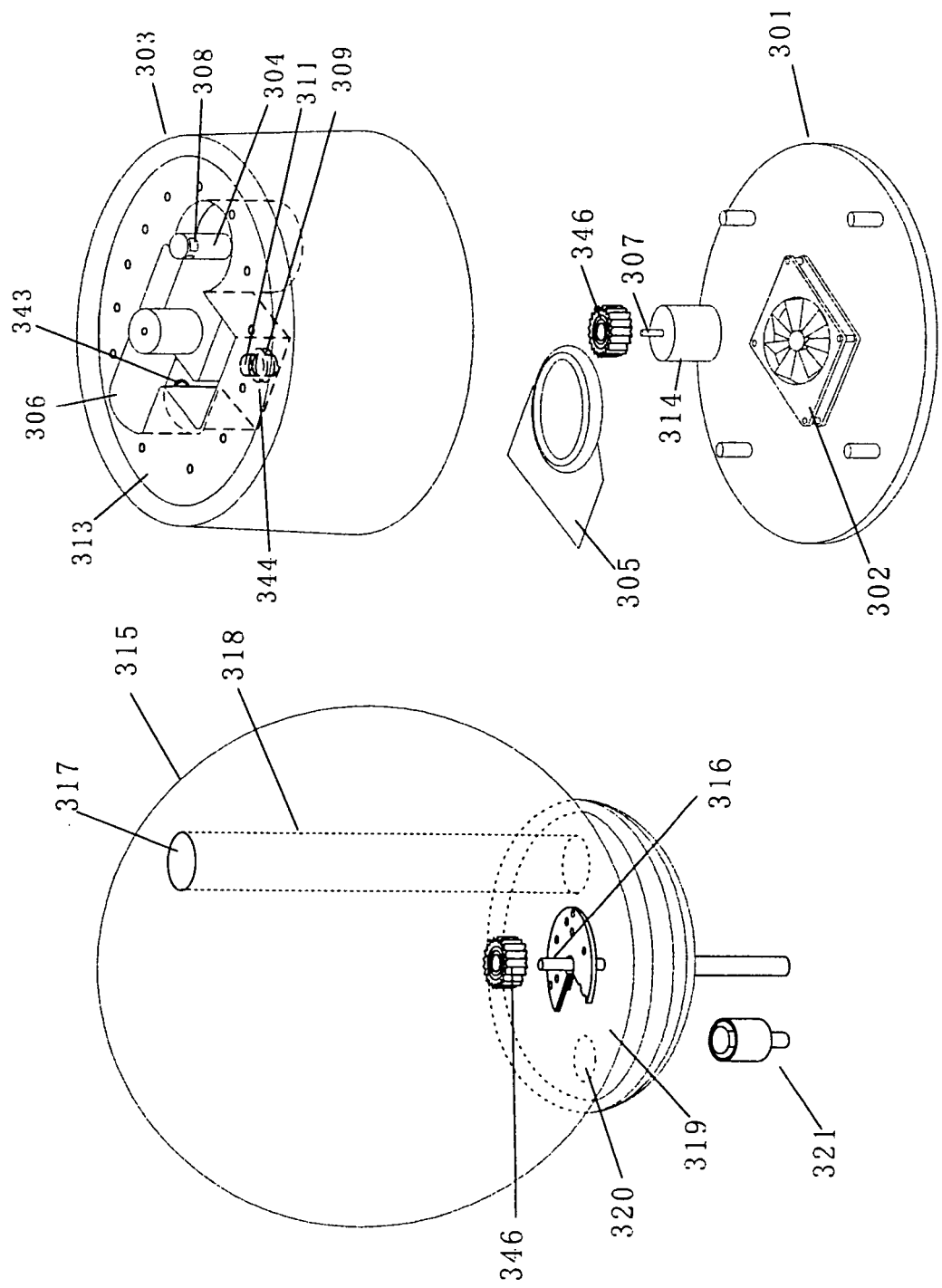
FIG. 1 illustrates an exploded view of the first embodiment of the present invention.
Figure 2:
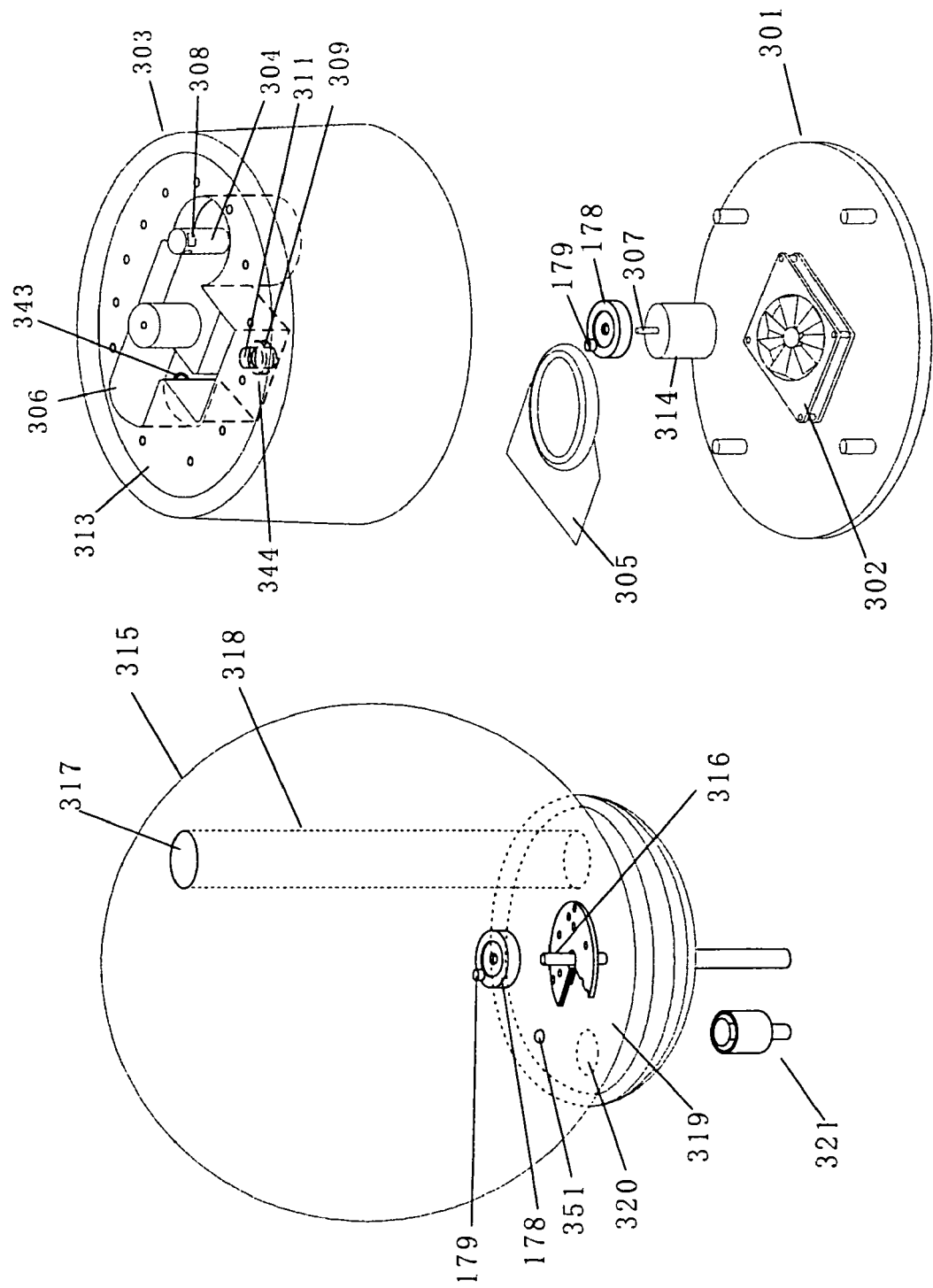
FIG. 2 illustrates an exploded view of the second embodiment of the present invention.
Figure 3:
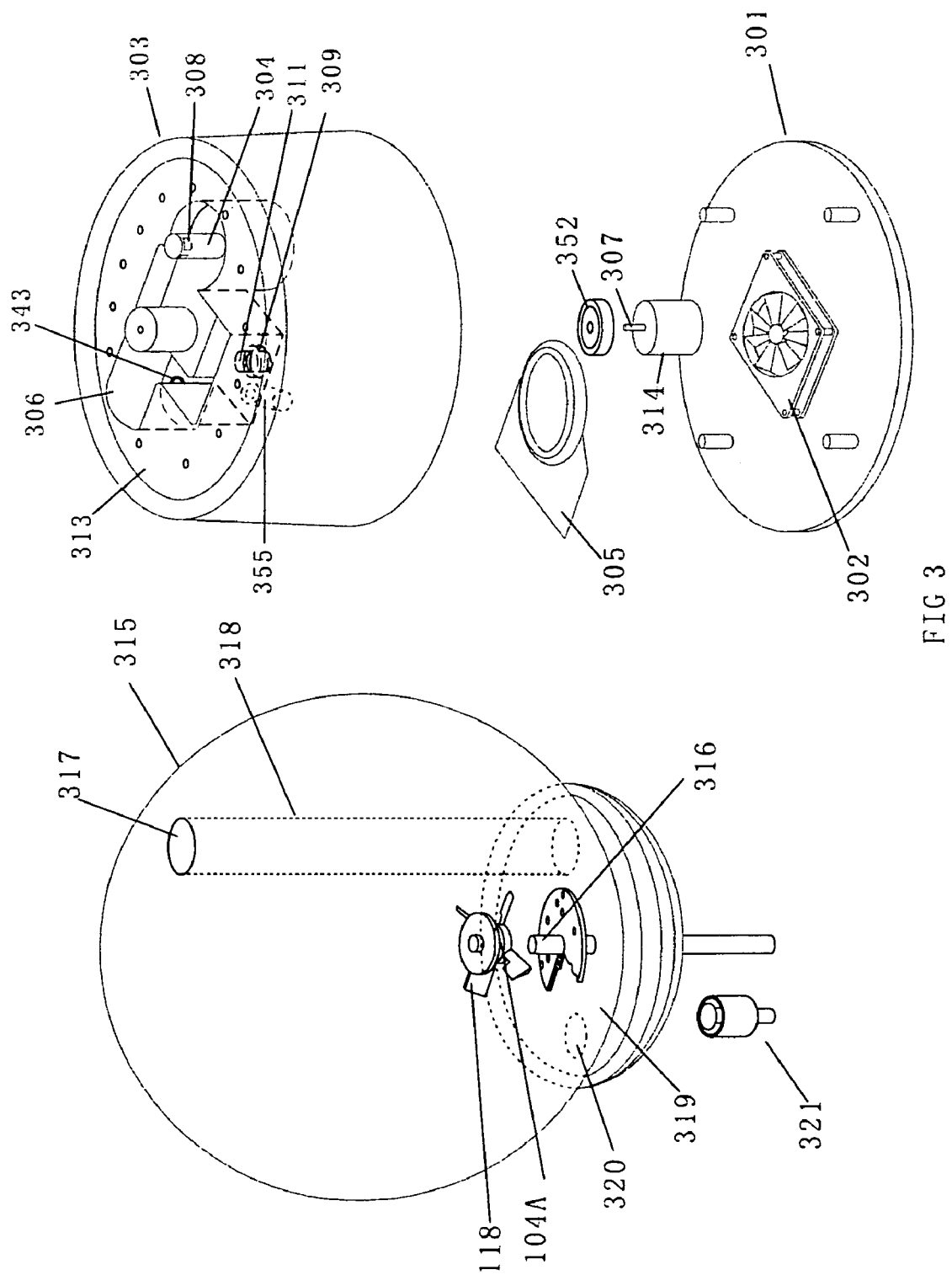
FIG. 3 illustrates an exploded view of the third embodiment of the present invention.
Figure 4:
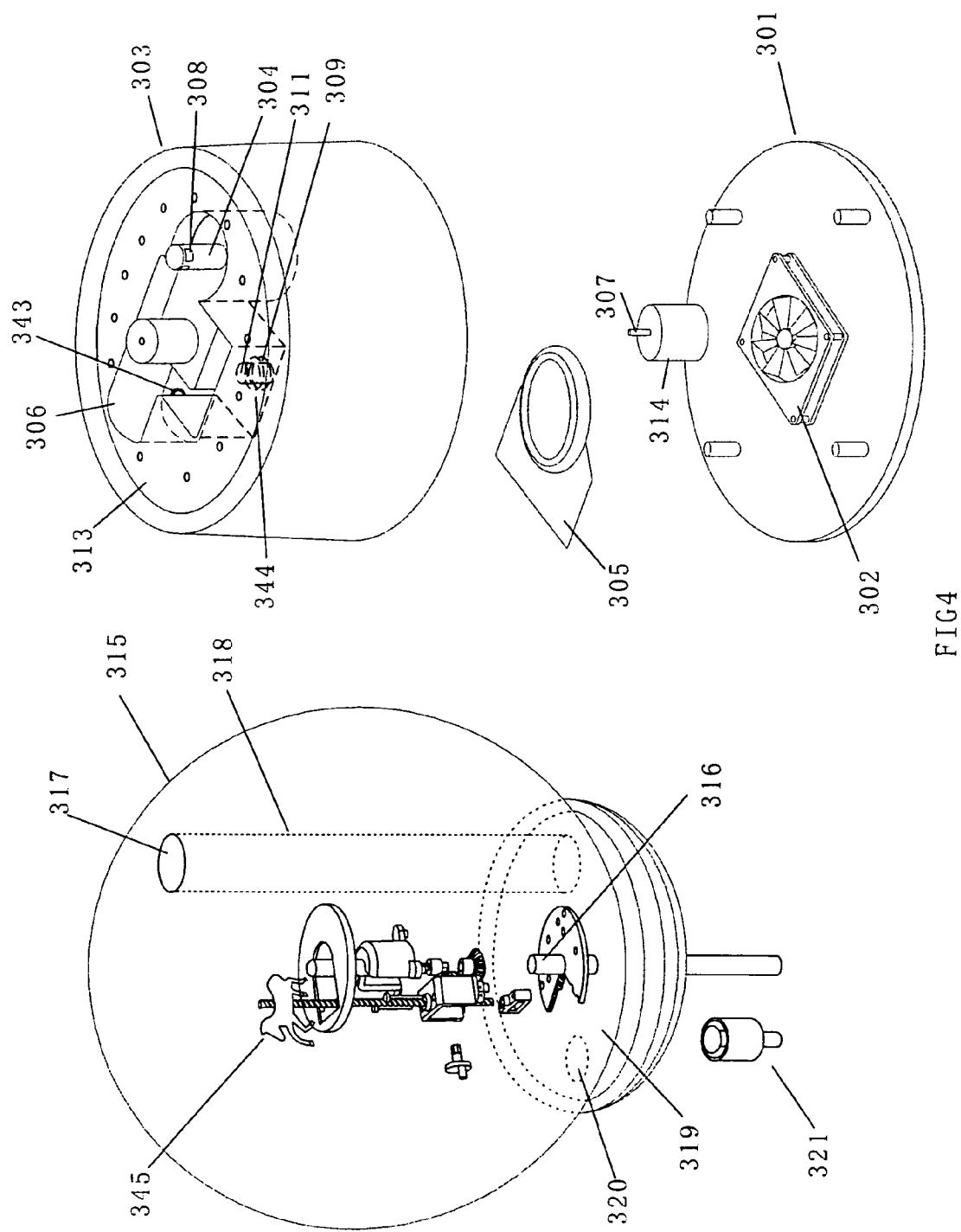
FIG. 4 illustrates an exploded view of the fourth embodiment of the present invention.
Figure 5:
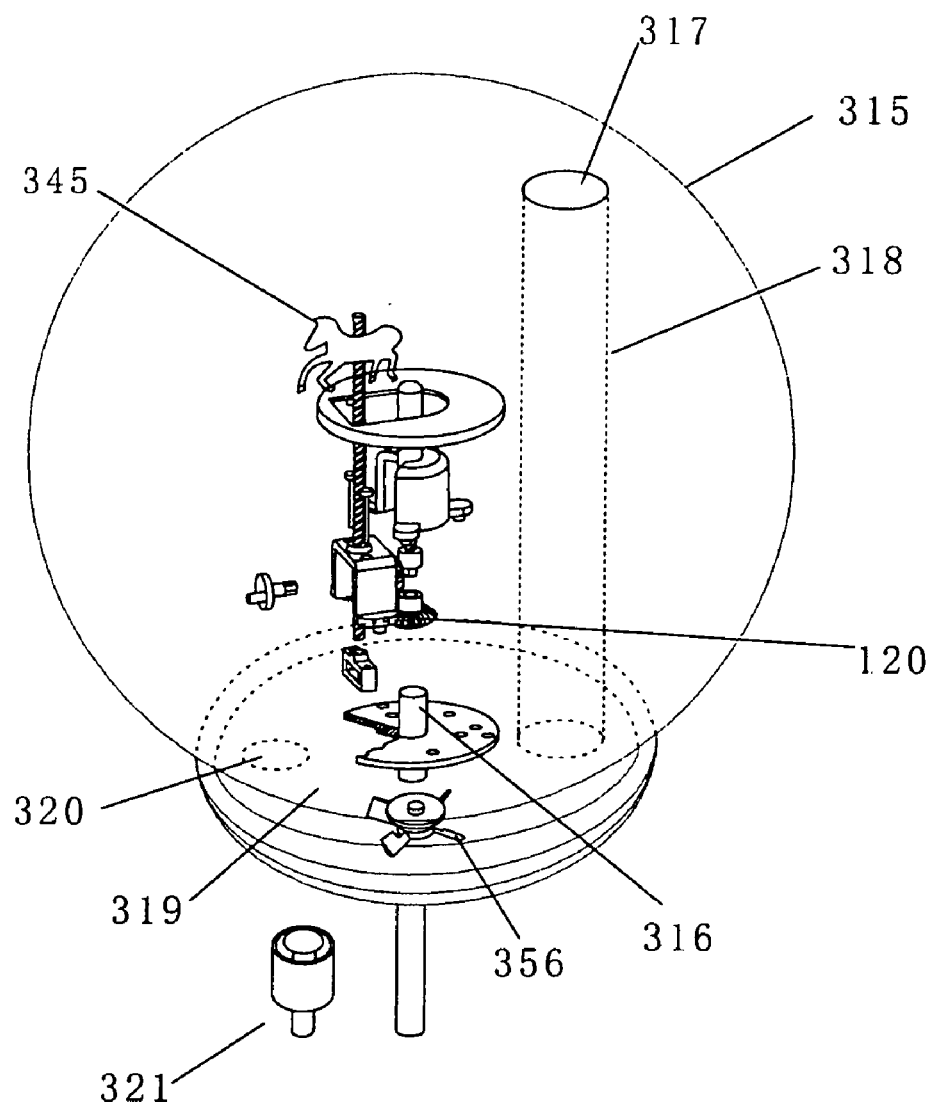
FIG. 5 illustrates an exploded view of the fifth embodiment of the present invention with some structures (e.g., for example a base seat, a abase plate, and relevant parts) not shown in this figure.

The first to fifth embodiments of the present invention shown in FIGS. 1-5 essentially are the same as each other except that in FIG. 1, a power source 314 having a shaft 307 which is operatively connected to a gear 346 are provided with the humidifier on a base plate 301 and a base board 319; in FIG. 2, a power source 314 having a shaft 307 which is operatively connected to a wheel 178 with an elongate drive stub 179 are provided with the humidifier on a base plate 301 and a base board 319, a light 351 is provided on the base board 319; in FIG. 3, a power source 314 having a shaft 307 which is operatively connected to a magnet 352 are provided with the humidifier on a base plate 301, a vane (fan) 118 and a magnet 104A are provided on the base board 319; in FIG. 4 simply the power source 314 having a shaft 307 are provided with the humidifier on a base plate 301, and a subassembly 345 and another shaft 316 are shown in a water receptacle 315; in FIG. 5, a fan 356, another shaft 316 and a subassembly 345 are provided in a water receptacle 315.

Please see FIGS. 1-4 for the detailed structure of the humidifier of the present invention. The humidifier mainly includes a base plate 301, a base seat 303, a water receptacle 315, a fan 302 installed on the base plate 301, a power source 314 (which can be a motor, a music box or the like), a shaft 307 of the power source 314, a sub-receptacle of water 306 in the base seat 303, a ultrasonic device 305 for transforming water into vapor, and a base board 319 of the water receptacle 315. The water receptacle 315 and the base board 319 are attached and sealed together so that the water in the water receptacle 315 does not leak through the border between the water receptacle 315 and the base board 319.

A water opening 320, a water exit valve 321, a vapor guide tube 318, and a vapor exit 317 are provided on the base board 319 for water receptacle 315. A spring not shown in the water exit valve 321 is provided for controlling the flow rate and on/off of the water flow downwardly from the water receptacle 315 through the base board 319, to the sub-receptacle for water 306. A shaft 316 operatively connected to the shaft 307 can be fastened with a gear 346. An opening not shown the drawing can be provided on the upper side of the water receptacle 315 to refill water, the water receptacle 315 is fixed on top of the base seat 3.

Figure 6:
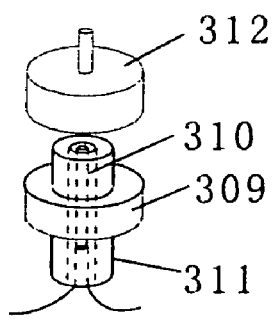
FIG. 6 depicts an automatic safety device for the humidifier.
Figure 7:
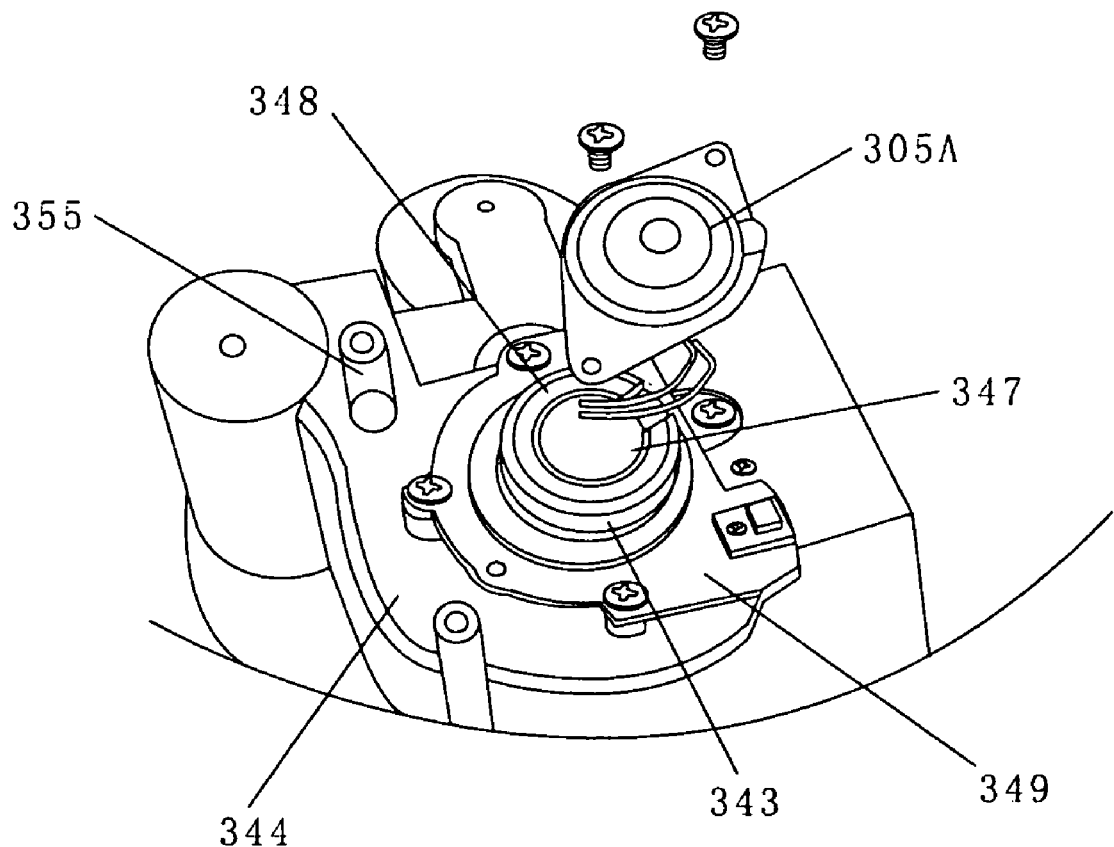
FIG. 7 depicts a ultrasonic device for transforming water into vapor.

An air guide to be 304 with an air opening 308 is provided on the sub-receptacle for water 306. Numeral 311 designates a water separation tube which is shown in FIG. 6; numeral 344 designates a base face of the sub-receptacle 306 for water; numeral 343 designates an opening where an ultrasonic device 305 (for transforming water into vapor) is installed next to it. The detailed structure of the ultrasonic device 305 is shown in FIG. 7. The ultrasonic device 305 can be replaced with a heater, a fan, or other conventional device for transforming water into vapor. Numeral 313 designates an upper face of the base seat 305.

When the humidifier is to be used, the water receptacle 315 is filled with water, the water can flow through the water opening 320 and into the sub-receptacle of water 306. The humidifier is turned on, the ultrasonic device 305 generates vapor. The fan 302 on the base plate 301 sucks air from the space under the fan 302 upwardly, forces the air to go through the air guide tube 304, toward the air opening 308. A recessed space is formed around the vapor guide tube 318 and the air guide tube 304 at the base board 319 for collecting vapor there. The air which is forced through the air opening 308 pushes the vapor through the vapor guide tube 318 and forces the vapor to exit through the vapor exit 317.

From the right upper half of FIG. 1, we can see that the air guide tube 304 is higher than the sub-receptacle of water 306 and the upper face 313 of the base seat 303, and the upper face 313 contacts tightly with the base board 319 of the water receptacle 315, therefore the water would not flow downward through the air opening 308.

When the power source 314 is turned on, the shaft 307 and the shaft 316 on top of the what 307 rotates to move the subassembly or the decoration (shown in e.g. FIGS. 13-28) operatively connected therewith.

Numeral 355 in FIGS. 3 and 7 designates an ozone mechanism for delivering ozone into the water in the sub-receptacle of water 306 under the water receptacle 315, so that the water therein contains ozone and the vapor from the humidifier also contains ozone. Alternatively, the ozone mechanism 355 can also be provided on the base seat 303. The fan 302 on the base plate 301 sucks air from the space under the fan upwardly, forces the air and the zone to go through the air guide tube 304, toward the air opening 308, so that the air, ozone, and vapor go through the vapor guide tube 318 and exit through the vapor exit 317.

In FIGS. 4 and 5, a subassembly 345 can be installed in the water receptacle 315. Alternatively, the subassemblies or structures shown in FIGS. 9, 12 and 16-28 can also be installed therein.

In FIG. 5, a fan 356 and the subassembly 345 are installed in the water receptacle 315 so that the fan 356 and the subassembly 345 (or other subassemblies or structures shown in FIGS. 8, 9, 12, 16-28) can be rotated simultaneously.

FIG. 6 depicts an automatic safety device for the humidifier, which is installed at the base face 344 of the sub-receptacle of water 306 on the base seat 303. The automatic safety device includes mainly a water separation tube 311, a sensing piece 310 in the water separation tube 311, a magnetic float 309 around the water separation tube 311, and a fixed head 312. When the sub-receptacle of water 306 is filled with water, the magnetic float 309 floats, thus the magnetism of the magnetic float 309 is sensed by the sensing piece 310 and the power is energized. On the other hand, when there is not enough water in the sub-receptacle of water 306, the magnetic float 309 drops downwardly, and the power is deenergized. This mechanism can be used in other drawings or embodiments of the humidifier of this invention.

FIG. 7 depicts a detailed structure of the ultrasonic device 305 for transforming water into vapor, in which numeral 347 designates an ultrasonic sheet which is surrounded with a rubber sheet 348. A printed circuit board 347 is provided for the ultrasonic device 305. An opening 343 is provided on the sub-receptacle of waster 306 of the base seat 303. Numeral 344 designates a base face of the sub-receptacle of water 306. An upper lid 305A holds the ultrasonic sheet 347 and the rubber sheet 348 in place, so that the water would not leak. When the humidifier is activated, the ultrasonic sheet 347 is activated to transform the water in the sub-receptacle of water 306 into vapor.

Figure 8:
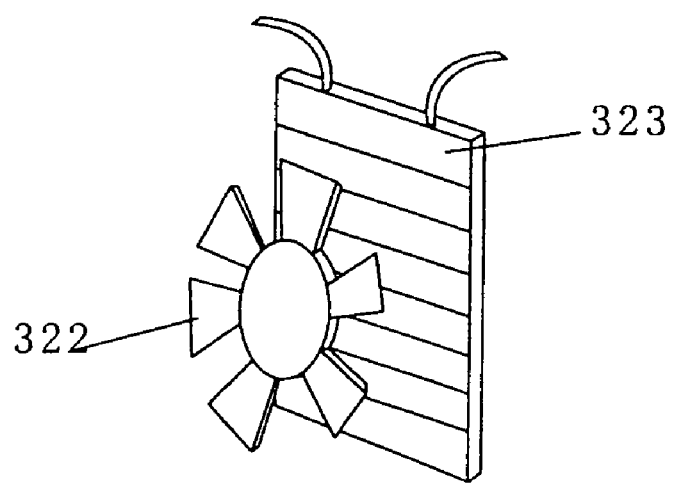
FIG. 8 depicts another device for transforming water into vapor.

FIG. 8 depicts an alternative device for transforming water into vapor, in which a numeral 323 designates heating sheets 323 and a numeral 322 designates a fan. When the humidifier is activated, the fan 322 blows air and/or water through the heating sheets 323. The heating sheets can also be used for heating the water in the receptacle 315 or the sub-receptacle of water 306. they can be also used in the other embodiments of the present invention, e.g., they can be used in FIGS. 9 and 12.

Figure 9:
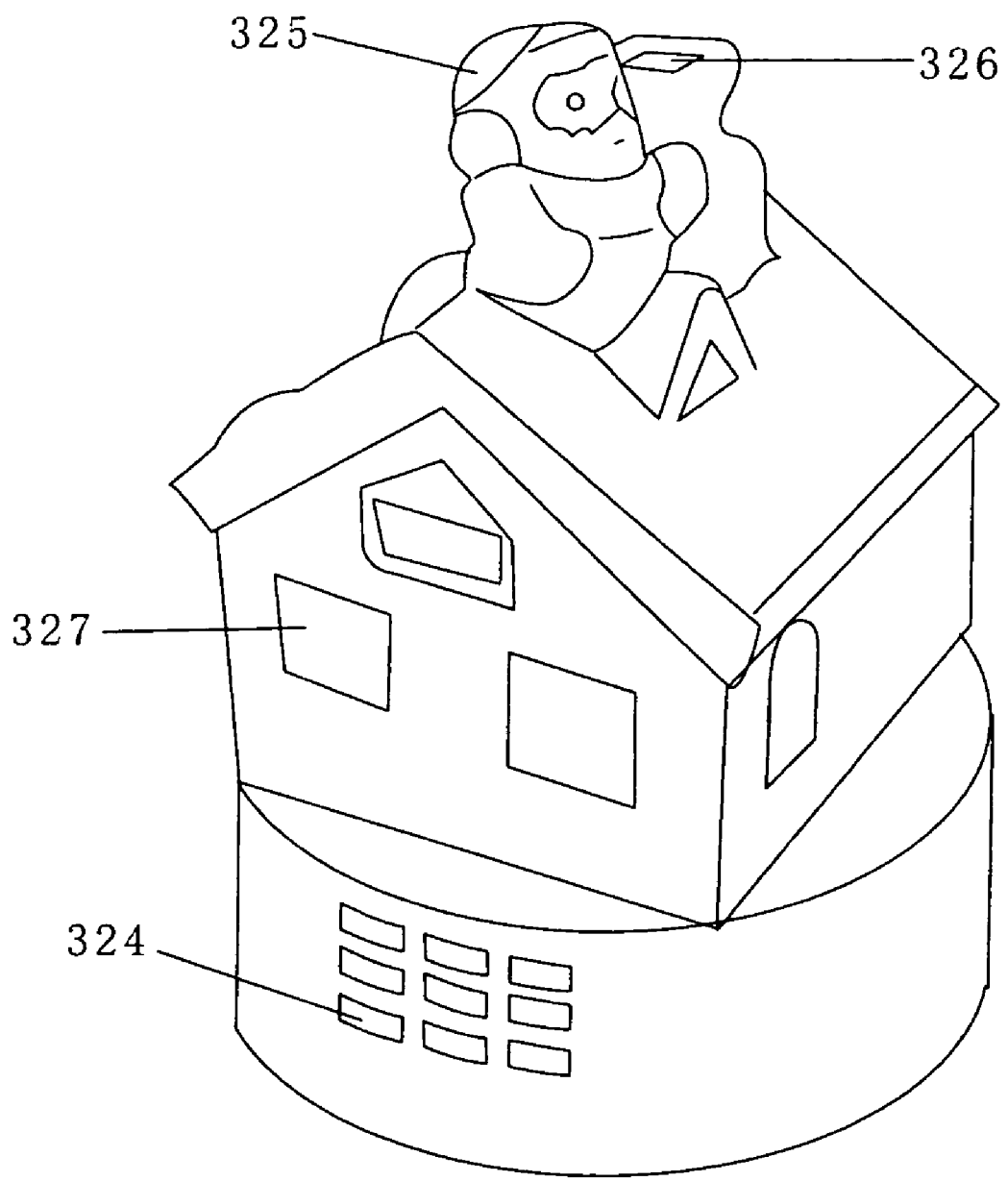
FIG. 9 illustrates a decoration that can be attached to the humidifier of the present invention.

FIG. 9 illustrates a decoration that can be attached to the humidifier, in which the vapor can exit through a vapor exit 326. The decoration 325 can be moved by a moving mechanism described in this invention so that it can move outside of the water receptacle 315. A light bulb (not shown in the drawings) can be provided on the base seat 302 of FIGS. 1-4 so that light beams can go out through windows 327. The heating sheets 323 and the fan 322 (shown in FIG. 8) can be installed inside of the air exits 324 so that heated air can exit from the air exits 324.

Figure 10:
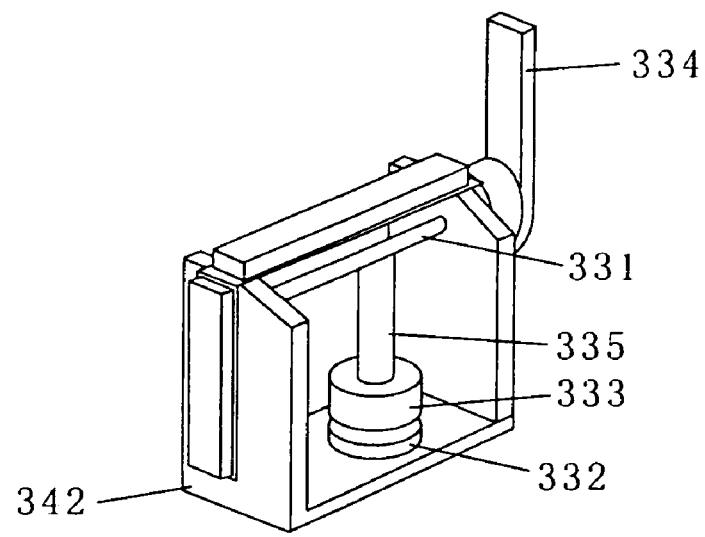
FIGS. 10 and 11 illustrates two moving mechanisms used with a decoration shown in FIG. 12.
Figure 11:
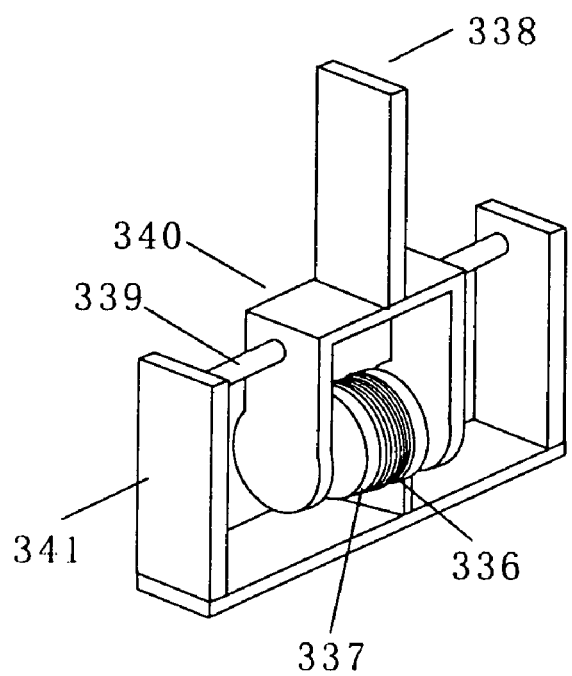
Figure 12:
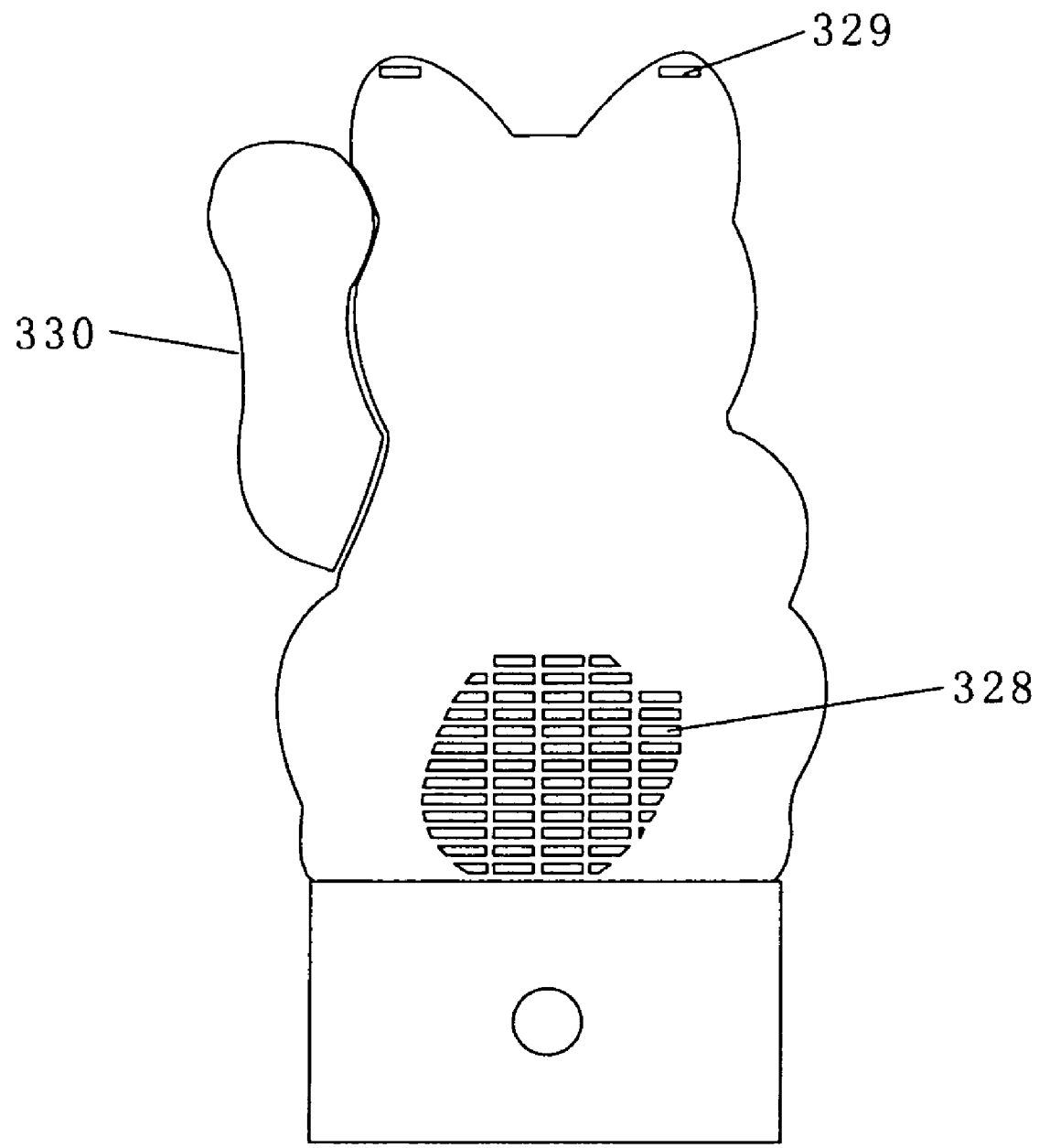
FIG. 12 illustrates another decoration that can be attached to the humidifier.

FIG. 12 illustrates another decoration that can be attached to the humidifier, and FIGS. 10-11 illustrate two moving mechanisms used with the decoration of FIG. 12. The moving mechanisms shown in FIGS. 10-11 include mainly a coil 332, 336; a magnet 333, 337; a shaft 339, 331; a rocking arm 334, 338; a rocking rode 335, 340; and a fastening frame 341, 342. when the coil 332, 336 is energized, a magnetic force is generated, the rocking rod 335, 340 moves back and forth, thus the rocking arm 334, 338 moves therewith. This makes an arm 330 in FIG. 12 moves back and forth. Numeral 329 in FIG. 12 designates a vapor exit from which a vapor can exit. If the heating sheets 323 and the fan 322 shown in FIG. 8 is used in this embodiment, a vapor and hot air can exit from an exit 328, or just hot air can exist from the exit 328.

The mechanisms shown in FIG. 10-12 can also be used with other embodiments of this invention.

Figure 13:
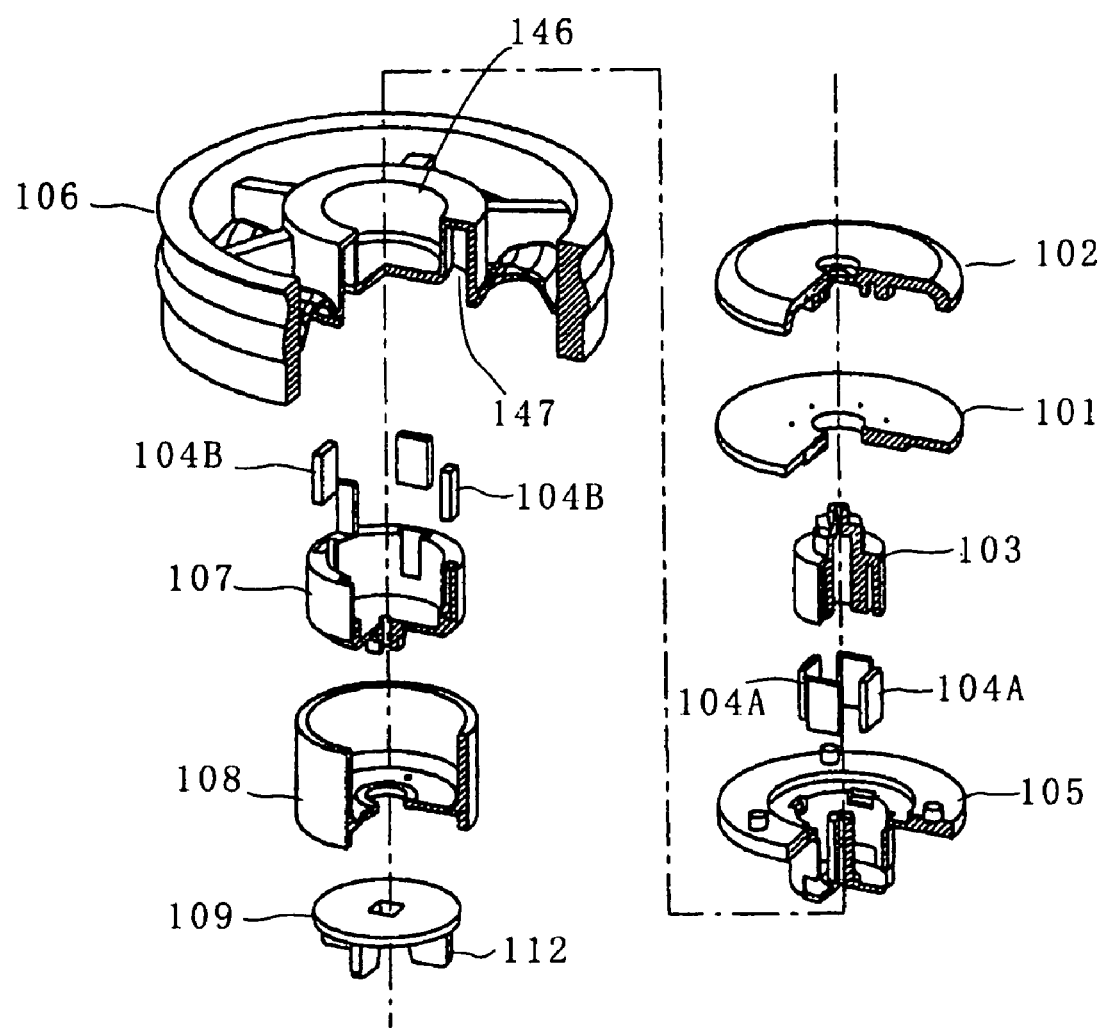

FIGS. 13-28 have basically been shown in a U.S. Pat. No. 6,978,654 (hereinafter designated as '654) invented by the same inventor as that of the present invention. FIGS. 13, 14, . . . , 27, and 28 illustrate a first, second, . . . , fifteenth, and sixteenth subassembly, respectively, that can be used with the embodiments shown in FIGS. 1-5.

FIG. 13 basically is the same as FIG. 1 of '564, but without the musical box and relevant parts shown on the left side thereof. In FIG. 13 the first magnets 104A and the second magnets 104B are for transmitting a movement from a power source from under a stopper member 106 to over the stopper member. A first rotary member 103, a second rotary member 107, a connecting member 105, and a lid 101 can further be provided. The first magnets 104A are installed in the first rotary member 103, the second magnets 104B are installed in the second rotary member 107, the connecting member 105 is fastened to the stopper member 106 and is provided for rotatably accommodating the first rotary member 103, the lid 101 is installed on the connecting member 105 for preventing the first rotary member 103 from falling off. The stopper member 106 can be provided with a first recessed portion 146 for accommodating the first rotary member 103 and the connecting member 105, and a second recessed portion 147 for accommodating the second rotary member 107.

The second rotary member 10 is fastened to the rotary piece 109 so as to rotate therewith. A socket member 108 which can be fastened to the stopper member 106 is for accommodating the second rotary member 107 so as to confine or stabilize the movement of the second rotary member 107. Numeral 102 designates a support on which a figurine or a subassembly can be positioned.

A rotary coupler 112 provided with the rotary piece 109 can be engaged with the shaft 307 or 316 of FIGS. 1-4 or other embodiments so that the subassembly shown in FIG. 13 can be in the water receptacle 315. The stopper member 106 can be rubber, metal, plastic or other suitable material.

FIG. 14 is the same as FIG. 4 of '564 but without the musical box and relevant parts. In FIG. 14, the subassembly has a decorative base member 116, a transparent housing 117, at least a first magnet 104A, and at least a second magnet 104B, at least one vane 118 fastened to the first magnet 104A for agitating some particles in the transparent housing 117 so that it looks like some flurries are moved upwardly and falling down. A lid 101 for installing the vane 118 and the magnet 104A; and another lid 119 provided to prevent the vane 118 and the magnet 104A falling off. The subassembly can work with the magnet 352 shown in FIG. 3 or the shaft 307 or 316 and FIGS. 1-4, or other embodiments, so that it can be in the water receptacle 315.

FIG. 15 is the same as FIG. 5 of '564, in which the subassembly includes a rotary member 148 and a magnet 104A positioned in a lid 101; and a lid 149 covering the lid 101, the rotary member 148, and the magnet 104A and has an opening so that the particles agitated by the rotary member 148 can exit. This subassembly can be connected to the shaft 307 or 316 and can work with other embodiments and be inside of the water receptacle 315.

Please note that the subassemblies shown in FIGS. 16-28 cannot be inside of the water receptacle 315, but also be outside of the water receptacle 315.

FIG. 16 is the same as FIG. 7 of '564, in which a gear 294 over a lid 293 is connected with the shaft 307 or 316 shown in FIGS. 1-4, two gears 296A and 296B are located engageable with the gear 294. The teeth of the gears 296A and 296B engage with teeth of a rotary cover 295. The teeth of the rotary plate 295 are provided on the inside face of a vertical wall on the peripheral of the rotary cover 295. When the shaft 307 or 316 rotates counterclockwisely, the gear 294 does the same, and the gears 296A and 296B, and the rotary cover 295 rotate clockwisely, and vice versa. A gear 297 can be fastened to the gear 294 or the rotary cover 295 so as to drive other elements not shown in the drawings. We can also eliminate the gear 297 and have a figurine or decoration mounted on the rotary cover 295. The subassembly shown in FIG. 16 can work with other embodiments or subassemblies and can be inside or outside of the water receptacle 315.

FIG. 17 is the same as FIG. 8 of '564, in which a gear 120 on a lid 101 can be connected with the shaft 307 or 316 shown in the FIG. 1-4. A connecting piece 131 is fastened to the gear 120 and is fixed with a rotary shaft 127 which is installed with a canopy 128. A housing 129 is provided around the shaft 127 indirectly (with a tube 150 in between) to stabilize the rotation of the shaft. The purpose of the tube 150 is to protect the shaft 127. A plate 130 is positioned around the shaft 127 for supporting some decoration (not shown in the drawings). Another gear 121 is engaged with the gear 120 and fastened with a wheel 124 which has an elongate drive stub 124A. A housing 122 is fixed to the lid 101 and is provided around the wheel 124. Another rotary shaft 132A and two guiding rods 125A and 125B are vertically inserted through the housing 122. A link 123 with a longitudinal slot 123A is fastened to the lower end of the rotary shaft 132A. A figurine (horse) 126A is fastened to the upper part of the rotary shaft 132A. The elongate drive stub 124A is movably located in the longitudinal slot 123A. The rotation of the gear 120 causes the rotation of the gear 121 and the wheel 124, which in turn causes the up and down movement of the link 123, the shaft 132A, the guiding rods 125A and 125B, and the horse 126A. The subassembly shown in FIG. 17 can work with other embodiments or subassemblies and can be inside or outside of the water receptacle 315.

FIG. 18 is the same as FIG. 9 of '564, in which a gear 120' on a lid 101 can be connected with the shaft 307 or 316 shown in FIGS. 1-4. Another gear 121 is engaged with the gear 120 and fastened with a wheel 124 which has an elongate drive stub 124A. A housing 122 is fixed to the lid 101 and is provided around the wheel 124. Another rotary shaft 132A and two guiding rods 125A and 125B are vertically inserted through the housing 122. A link 123 with a longitudinal slot 123A is fastened to the lower end of the rotary shaft 132A. A figurine (horse) 126A is fastened to the upper part of the rotary shaft 132A. The elongate drive stub 124A is movably located in the longitudinal slot 123A. The rotation of the gear 120 causes the rotation of the gear 121 and the wheel 124, which in turn causes the up and down movement of the link 123, the shaft 132A, the guiding rods 125A and 125B, and the horse 126A. The subassembly shown in FIG. 18 can work with other embodiments or subassemblies and can be inside or outside of the water receptacle 315.

FIG. 19 is the same as FIG. 10 of '564, in which a gear 120 over a lid 101 can be connected with the shaft 307 or 316 shown in FIGS. 1-4. Two other gears 121 and 121' are engaged with the gear 120 and fastened with wheels 124 and 124', respectively, which have elongate drive stubs 124A and 124A' respectively. Housings 122 and 122A are fixed to the lid 101 and are provided around the wheels 124 and 124' respectively. Rotary shafts 132A and 132B and two pairs of guiding rods 125A, 125B, and 125A', 125B' are inserted through the housings 122 and 122A respectively. A plate 130 is provided around the shafts 132A and 132B for supporting some decoration (not shown in the drawings). Links 123 and 123' with longitudinal slots 123A and 123A' respectively are fastened to the lower end of the rotary shafts 132A and 132B respectively. The elongate drive stubs 124A and 124A' are movably located in the longitudinal slots 123A and 123A' respectively. The rotation of the gear 120 causes the rotation of the gears 121 and 121' and the wheels 124 and 124', which in turn causes the up and down movement of the links 123 and 123', the shafts 132A and 132B, the guiding rods 125A, 125B, 125A' and 125B', and the horses 126A and 126B. Decoration plates 133 and 133' are employed to cover a side of the housings 122 and 122A respectively. The subassembly shown in FIG. 19 can work with other embodiments or subassemblies and can be inside or outside of the water receptacle 315.

FIG. 20 is the same as FIG. 11 of '564, in which a gear 120 over a lid 101 can be connected with the shaft 317 or 316 shown in FIGS. 1-4. FIG. 20 differs from FIG. 19 in that a connecting piece 131 is fixed to the gear 120 and is fastened with a rotary shaft 127 which is protected with a tube 150 and which is fastened with a canopy 128 on its top end. That is to say, all of the elements shown in FIG. 20, except the connecting piece 131, the rotary shaft 127, the tube 150, and the canopy 128, can also be exactly the same as the third embodiment shown in FIG. 19, instead of those shown in FIG. 20. In FIG. 20, one housing 122 is employed to replace the two housings 122 and 122A shown in FIG. 19. Links 134 are fastened to the lower ends of the shafts 132A and 132B respectively for being moved by the elongate drive stubs 124A and 124A, respectively. Two connecting pieces 135 are employed for installing the wheels 124, 124' and the gears 121, respectively. The subassembly shown in FIG. 20 can work with other embodiments or subassemblies and can be inside or outside of the water receptacle 315.

Figure 21:
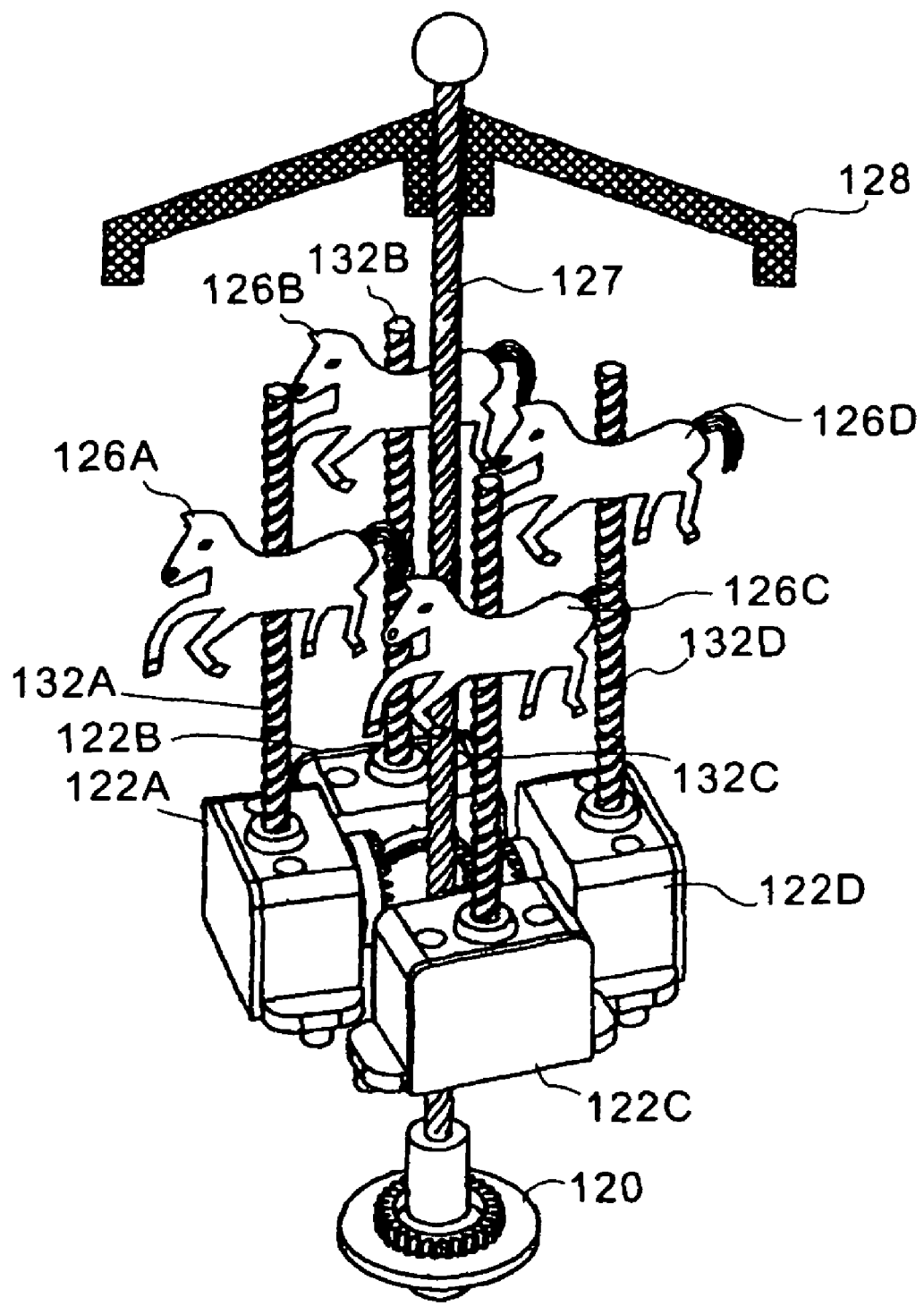

FIG. 21 is the same as FIG. 12 of '564, in which a gear 120 can be connected with the shaft 307 or 316 shown in FIG. 1-4. The subassembly shown in FIG. 21 is very similar to the fourth embodiment (FIG. 20) of the subassembly. In FIG. 21, there are four rotary shafts 132A, 132B, 132C, 132D for installing four horses 126A, 126B, 126C, 126D respectively. Four housings 122A, 122B, 122C, 122D are provided around the four rotary shafts 132A, 132B, 132C, 132D respectively. A rotary shaft 127 is installed on a bearing 120 and is fastened with a canopy 128. The subassembly shown in FIG. 21 can work with other embodiments or subassemblies and can be inside or outside of the water receptacle 315.

Figure 22:
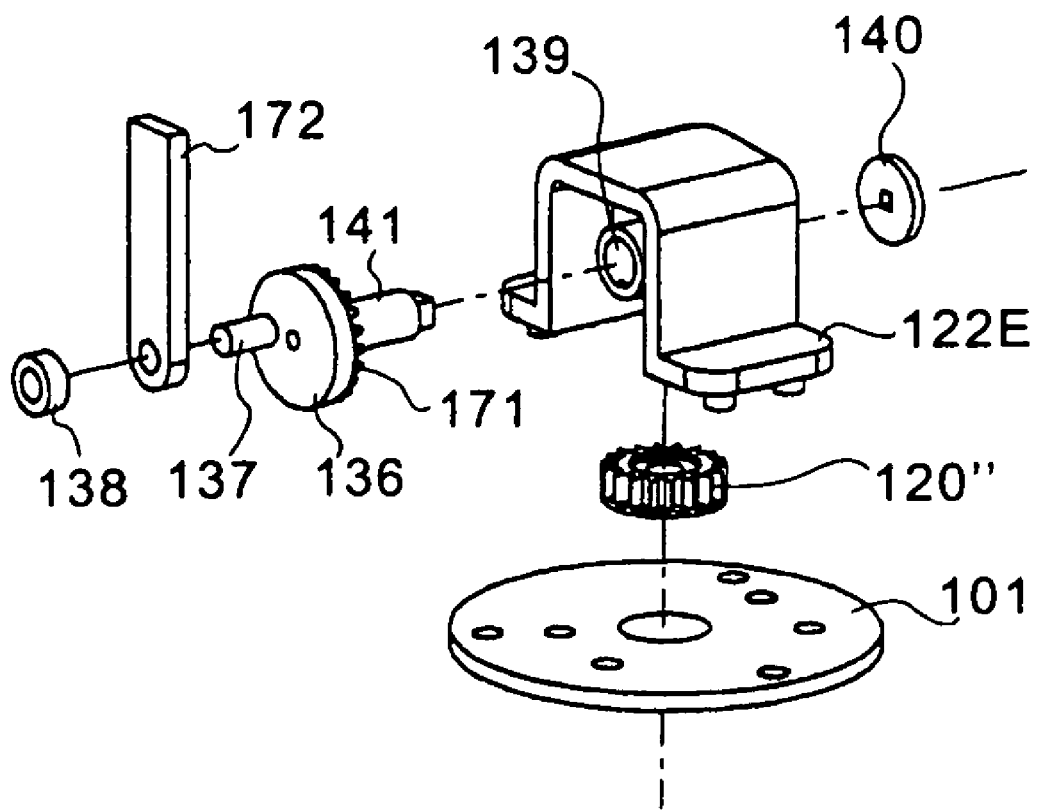
Figure 23:
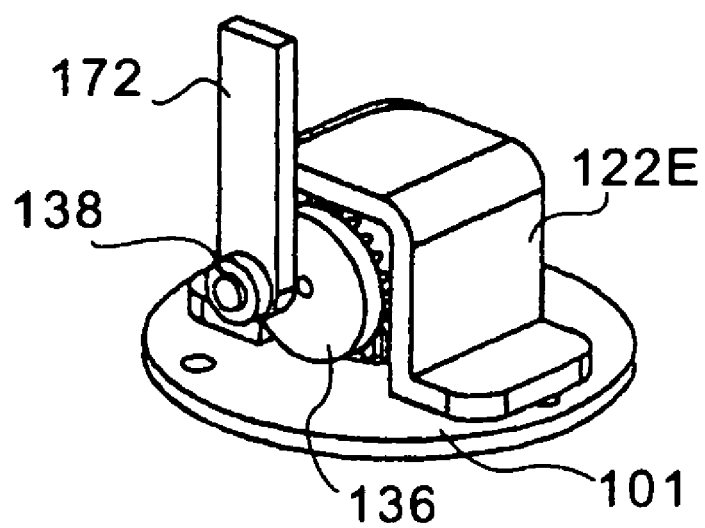

FIGS. 22 and 23 are the same as FIGS. 13 and 14 of '564, in which a gear 120" over a lid 101 can be connected with the shaft 307 or 316 shown in FIGS. 1-4. A housing 122E can be fastened to the lid 101. A support tube 139 is provided on the housing 122E, for rotatably supporting a shaft 141. A wheel 136 and a gear 171 (which is engageable with the gear 120") are fixed on the shaft 144. An elongate drive stub 137 is provided on the wheel 136. The stub 137 can be inserted through a hole provided on a rod 172 on which a figurine or a decoration can be fixed. A ring 138 and a fastening piece 140 are fixed to the stub 137 and the end of the shaft 141, respectively. When the gear 120" rotates, the gear 171 and the wheel 136 rotate, thus in turn the stub 137 causes the rod 172 to do reciprocating movement. The subassembly shown in FIGS. 22 and 23 can work with other embodiments or subassemblies and can be inside or outside of the water receptacle 315.

Figure 24:
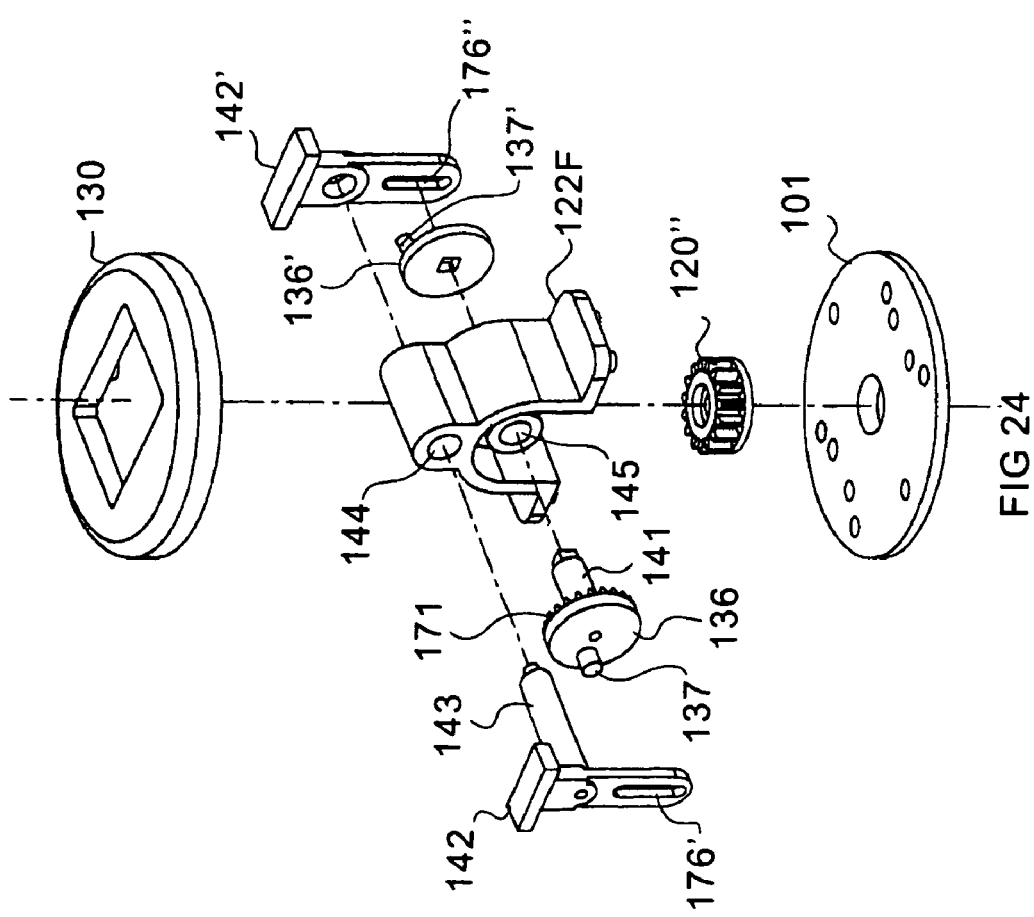

FIG. 24 is the same as FIG. 15 of '564, in which a gear 120" over a lid 101 can be connected with the shaft 307 or 316 shown in FIGS. 1-4. A housing 122F can be fastened to the lid 101. Two support tubes 144 and 145 can be formed on the housing 122F, for rotatably supporting shafts 141 and 143. A wheel 136 and a gear 171 (which is engageable with the gear 120") are fixed on one side of the shaft housing 122F 141. Another wheel 136' is fixed in the other side of the shaft 141. The wheels 136 are 136' are provided with elongate drive stubs 137 and 137', respectively. Connecting pieces 142 and 142' are fixed to the two ends of the shaft 141, respectively. Longitudinal slot 176' and 176", in which the elongate drive stubs 137 and 137' can slide respectively, are formed on the connecting pieces 142 and 142', respectively. Figurines or decorations can be positioned on the connecting pieces 142 and 142'. A plate 130 is provided for supporting figurines or decorations. When the gear 120" rotates, the gear 171, the shaft 141, and the wheels 136 and 136' rotates therewith, thus in turn causes the connecting pieces 142 and 142' to do reciprocating movement. The subassembly shown in FIG. 24 can work with other embodiments or subassemblies and can be inside or outside of the water receptacle 315.

Figure 25:
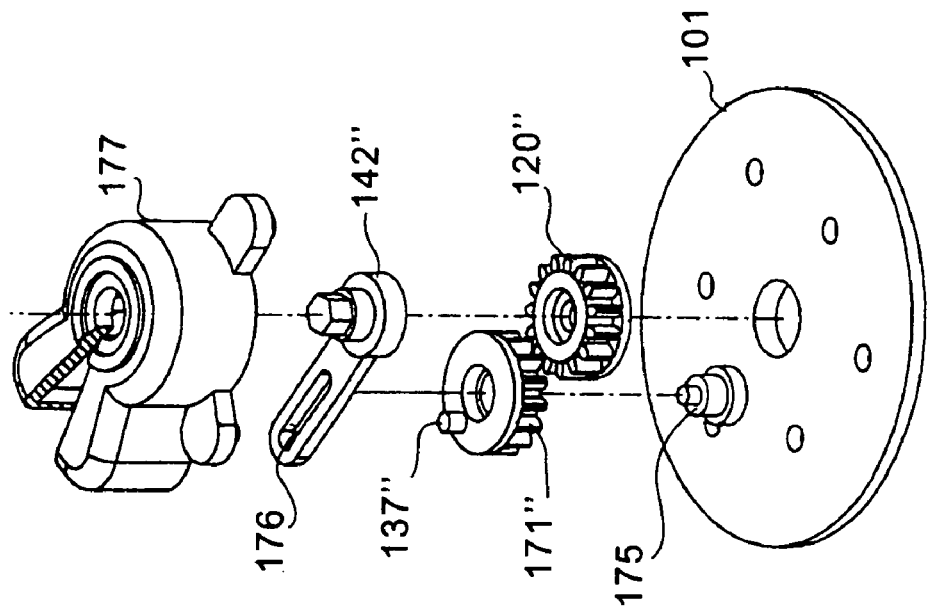

FIG. 25 is the same as FIG. 16 of '564, in which a gear 128" over a lid 101 can be connected with the shaft 307 or 316 shown in FIGS. 1-4. A rod 175 is fixed on the lid 101. A gear 171' and a wheel 136" having a through hole in the central portion thereof respectively are rotatably installed on the rod 175. The gear 171' is engageable with the gear 120". An elongate drive stub 137" is formed on the wheel 136". A connecting piece 142", on which a figurine or decoration can be fixed, is rotatably installed on top of the gear 120". The connecting piece 142" is formed with a longitudinal slot 176 in which the elongate drive stub 137" can slide. A lid 177 is positioned over connecting piece 142" for confining the movement of the connecting piece 142". When the gear 120" rotates, the gear 171', and the wheel 136" rotate, thus in turn causes a reciprocate movement of the connecting piece 142". The subassembly shown in FIG. 25 can work with other embodiments or subassemblies and can be inside or outside of the water receptacle 315.

Figure 26:
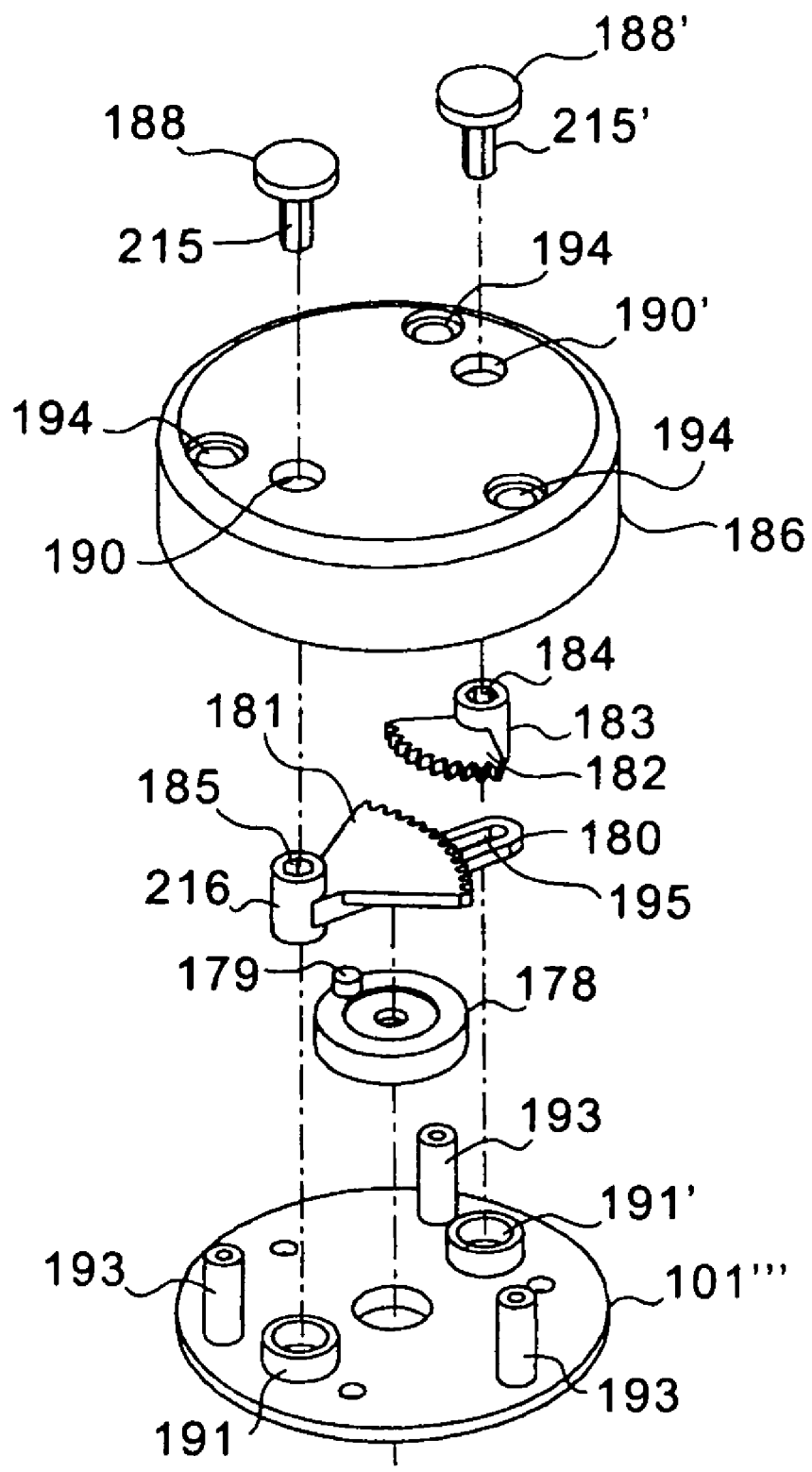

FIG. 26 is the same as FIG. 17 of '564, in which a wheel 178 having an elongate drive stub 179 can be connected with the shaft 307 or 316 shown in FIGS. 1-4. A plurality of tubes 193, 191, 180 having a longitudinal slot 195 is fixed with a tube 216 having a hole 185 and a gear plate 181. A tube 183 having a hole 184 is fixed with a gear plate 182. The elongate drive stub 179 is located in the longitudinal slot 195 and slidable therein when the wheel 178 rotates. A cover plate 186 is positioned on the lid 101'" and is provided with holes 194, 190 and 190'. The upper ends of the tubes 193 are fastened at the holes 194 of the cover plate 186. Two supports 188 and 188' for supporting figurines or decorations thereon are fixed with rods 215 and 215' respectively. The rods 215 and 215' are inserted through the holes 190 and 190' respectively, and fastened in the holes 185 and 184 of the tubes 216 and 183 respectively. The tubes 216 and 183 are rotatably installed in the tubes 191 and 191' respectively. When the wheel 178 rotates, the elongate drive stub 179 drives the moving piece 180, the tube 216 and the gear plate 181 which engages with the gear plate 182 to reciprocate. Thus this causes the gear plate 182, the tube 183, the rods 215 and 215', and the supports 188 and 188' to reciprocate. The subassembly shown in FIG. 26 can work with other embodiments or subassemblies and can be inside or outside of the water receptacle 315.

Figure 27:
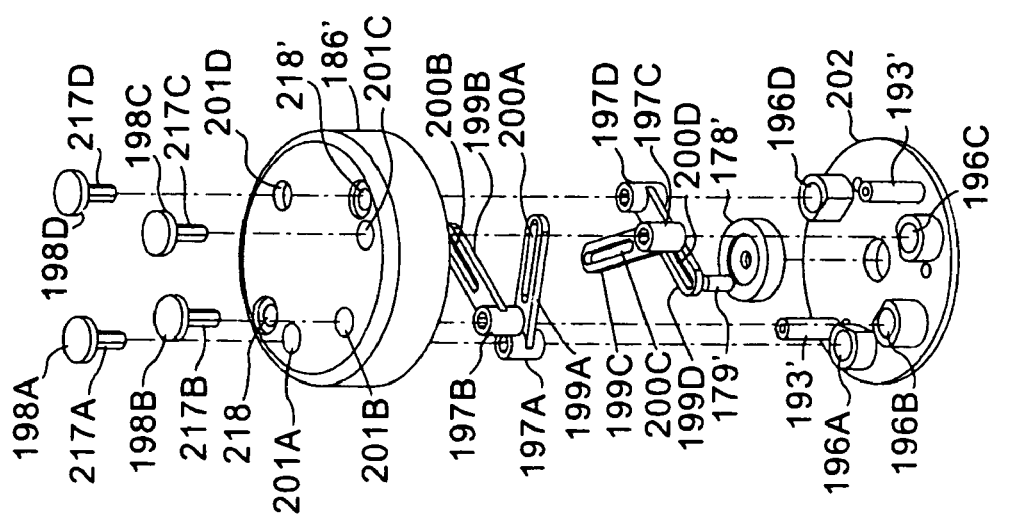

FIG. 27 is the same as FIG. 18 of '564, in which a wheel 178' having an elongate drive stub 179' can be connected with the shaft 307 or 316 shown in FIGS. 1-4. A plurality of tubes 193', 196A, 196B, 196C, and 196D are provided on the lid. Rotary tubes 197A, 197B, 197C, and 197D are rotatably installed in the tubes 196A, 196B, 196C, and 196D respectively, and fastened with connecting pieces 199A, 199B, 199C, and 199D respectively, which are provided with longitudinal slots 200A, 200B, 200C, and 200D respectively. The elongate drive stub 179' can be inserted into the longitudinal slots 200A, 200B, 200C, and 200D and slide therein when the wheel 178' rotates. A cover plate 186' is positioned on the lid 202 and is provided with holes 218, 218', 201A, 201B, 201C, and 201D. Supports 198A, 198B, 198C, and 198D for supporting figurines or decorations thereon are fastened with rods 217A, 217B, 217C, and 217D respectively, which insert through the holes 201A, 201B, 201C, and 201D on the cover plate 186' respectively, and installed in the rotary tubes 197A, 197B, 197C, and 197D respectively. When the wheel 178' rotates, the elongate drive stub 179' drives the connecting pieces 199A, 199B, 199C, and 199D to reciprocate, and the rotary tubes 197A, 197B, 197C, and 197D to rotate, respectively. Thus the rods 217A, 217B, 217C, and 217D, and supports 198A, 198B, 198C, and 198D rotate respectively. The cover plate 186' is fastened to the upper ends of the tubes 193' at the holes 218 and 218'. The movement of the connecting pieces 199A, 199B, 199C, and 199D does not interfere with each other because they are on different heights (levels). The subassembly shown in FIG. 27 can work with other embodiments or subassemblies and can be inside or outside of the water receptacle 315.

Figure 28:
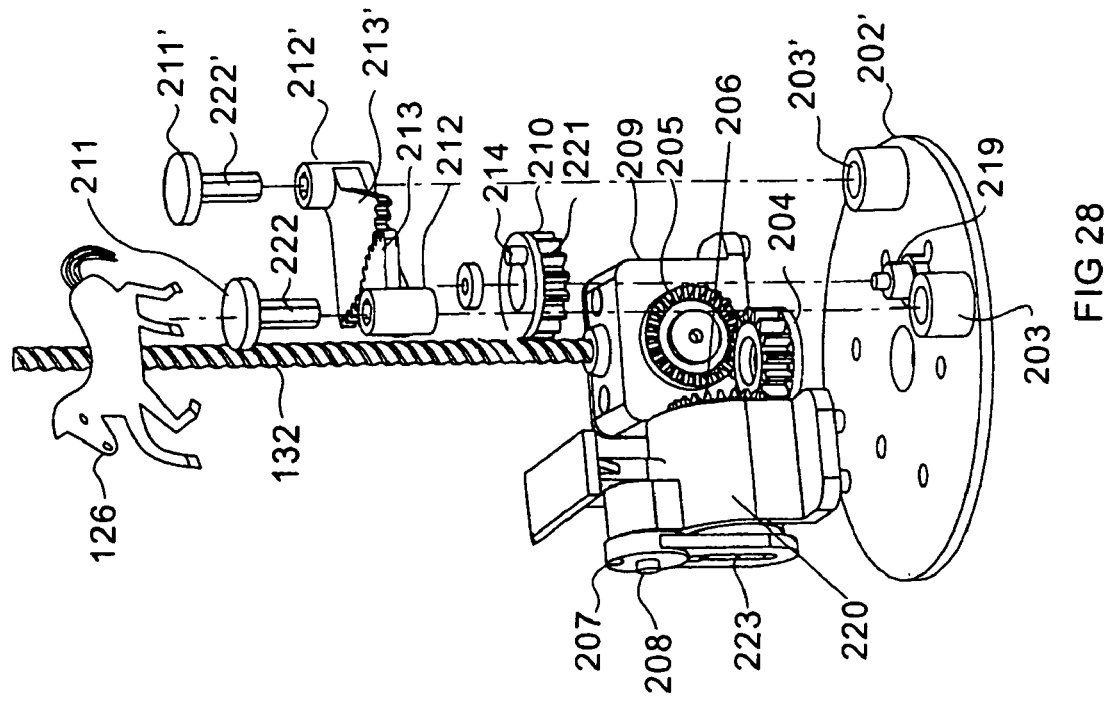

FIG. 28 is the same as FIG. 19 of '564, in which a gear 204 can be connected with the shaft 307 or 316 shown in FIGS. 1-4. A rod 219 and tubes 203 and 203' are provided on the lid 202'. A gear 221 and a wheel 210 having an elongate drive stub 214 are rotatably provided on the rod 219. A gear 204 engageable with the gear 221 can be installed on a rotary rod 219 and tubes 103 (FIG. 1) and rotate therewith. A rotary tube 212 is fixed with a gear plate 213 which is engageable with a gear plate 213' fixed with a rotary tube 212'. A moving piece and a longitudinal slot (in which the elongate drive stub 214 slides) similar to the moving piece 180 and the longitudinal slot 195 shown in FIG. 17 are provided under the gear plate 213 and fixed to the rotary tube 212. Supports 211 and 211' for supporting figurines or decorations having rods 222 and 222' are fastened to the rotary tubes 212 and 212' respectively, with the rods 222 and 222' inserted into the tubes 212 and 212' respectively. When the wheel 210 rotates, the stub 214 drives the tubes 212 and 212', the gear plates 213, and 213', and the supports 211, and 211' to move. A housing 209 is fastened to the lid 202', with a rotary shaft 132 provided therethrough. A gear 205 (engageable with the gear 204) and a wheel with an elongate drive stub (not shown in the drawing) (similar to the gear 121 and wheel 124 with an elongate drive stub 124A in FIG. 8) can be installed on the housing 209. A link with a longitudinal slot (not shown in the drawing) (similar to the link 123 with the longitudinal slot 123A in FIG. 8) can be fixed to the lower end of the shaft 125. When the wheel 205 rotates, the shaft 132 and the horse 126 move upwardly and downwardly. Another housing 220 is fastened to the lid 202' with a gear 206 rotatably installed on it. The gear 206 is engageable with the gear 204. The inside structure of the housing 220 is similar to that shown in FIGS. 13 and 14 (i.e., a wheel with an elongate drive stub not shown in the drawing is fastened to the gear 206). A connecting piece 207 having a longitudinal slot 223 is rotatably installed on a shaft 208. The elongate drive stub in the housing 220 is located in the longitudinal slot 223 and can slide thereon. A figurine or a decoration can be fastened to the connecting piece 207. When the gear 206 rotates, the wheel rotates, the stub drives the connecting piece 207 to reciprocate. The subassembly shown in FIG. 28 can work with other embodiments or subassemblies and can be inside or outside of the water receptacle 315.

Other variations can be provided with the embodiments described hereinabove, e.g., a filter (not shown in the drawings) can be provided near the fan 302 for filtering the air.

FIGS. 29-32 show various embodiments of the present invention which are similar but different from the structures shown in FIGS. 1-5. The embodiments shown in FIGS. 29-32 can use same shaft (307 and 316 in FIGS. 1-5, 708 and 703 in FIG. 29, and 507 and 1316 in FIG. 31), and can blow wind, humidify the air, and clean the air, while providing a special effects of a waterfall. These embodiments can be used with the structures shown in FIGS. 6-28 and 35-39, to enhance the functional and decorational effects.

Figure 29:
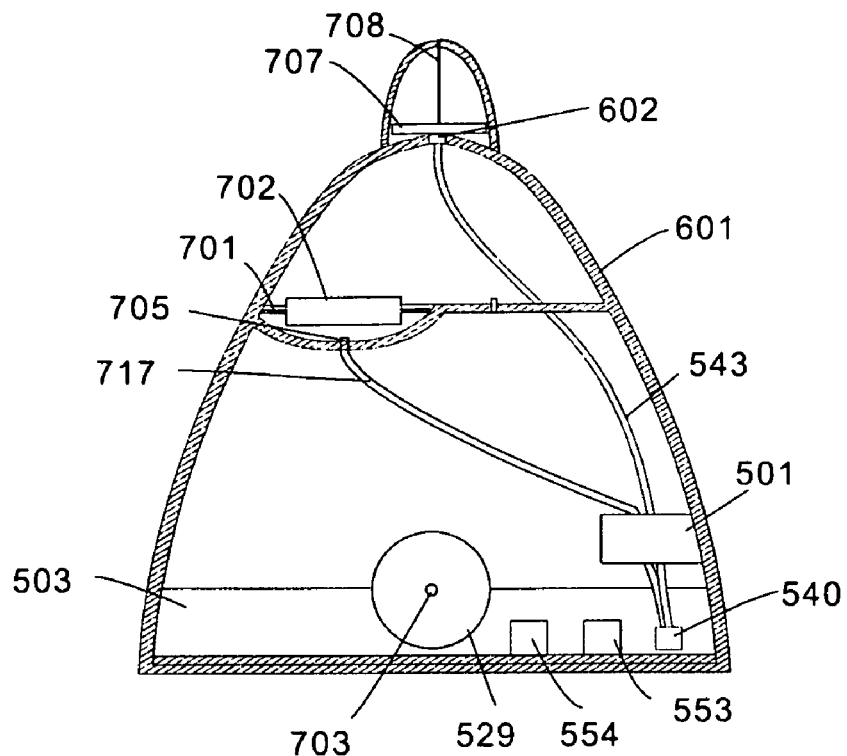
FIG. 29 illustrates an embodiment of the present invention, in which the structures of FIGS. 8-28 and 33-39 can also be used with this embodiment.

As shown in FIG. 29, the embodiment can have the visual effects of a waterfall, and has a decorative housing 601, which has a first water exit 602. A water sub-receptacle 503 is provided on the lower part of the housing 601. A filter 530, a bag 553 having ice, air freshener, and/or aromatic material, and an air cleaning device 554 can be provided on the bottom of the water sub-receptacle 503, which also has a water pump 540 which is connected with a first water exit 602 through a water pipe 543. Water repeatedly flows from the water exit 602 and creates a visual effects of a waterfall, which can clean the air blown against the waterfall by a fan 501. Therefore, this embodiment can clean the air, humidify the air, and serve as a decoration.

At least a water wheel 702, 709 or air cleaning water wheel 529 is provided on the housing 601. The water wheel 702, 707 or air cleaning water wheel 529 is provided with a shaft 701, 708 or 703 respectively, which in turn can connect with a gear 294 shown in FIG. 16, an eccentric wheel 178 shown in FIG. 26, and eccentric wheel 124 shown in FIG. 18, a conveyor belt (not shown in the drawings), the decoration through a mechanism shown in FIGS. 8-28, 38, and 39, a fan 322 shown in FIG. 8, or directly a decoration.

The water flows continuously out of the water exit 602 and exerts a force against the water wheel 707, 702, or the air-cleaning water wheel 529 so that the shaft 708, 701 or 703 of the water wheel 707, 702, or the air cleaning water wheel 529 respectively rotates, so does the decoration on the shaft 708, 701, or 703, or the mechanisms shown in FIGS. 8-28, 38, 39 and the decoration connected therewith.

On the other way, the water from the water pump 540 can flow through a branch water pipe 717, and exit at a water exit 705 and exert a force directly against the water wheel 702, so that the shaft 701 on the water wheel 702 rotates, so does the decoration on the shaft 701, or the mechanisms shown in FIGS. 8-28, 38, and 39 and the decoration connected therewith.

Figure 30:
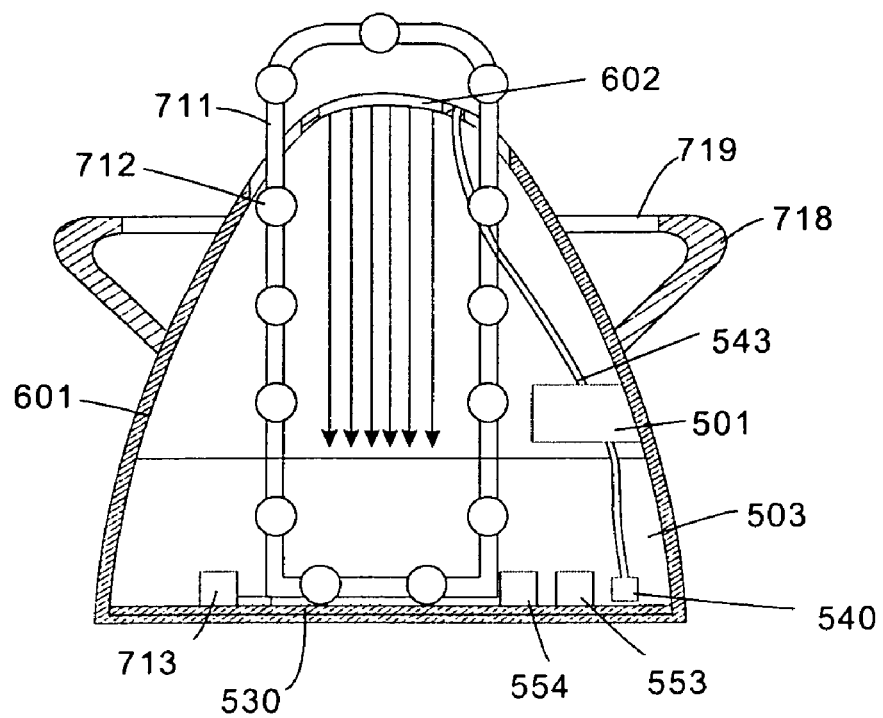
FIG. 30 illustrates another embodiment of the present invention, in which the structures of FIGS. 8-28 and 33-39 can also be used with this embodiment.

As shown in FIG. 30, the embodiment can have the visual effects of a waterfall, and has a decorative housing 601, which has a first water exit 602. A water sub-receptacle 503 is provided on the lower part of the housing 601. A filter 530, a bag 553 having ice, air freshener, and/or aromatic material, and an air cleaning device 554 can be provided on the bottom of the water sub-receptacle 503, which also has a water pump 540 which is connected with a first water exit 602 through a water pipe 543. A fan 501 is provided on the housing 601. When the power is turned on, water sub-receptacle 503 is filled with water. The water is pumped by the water pump 540, flows to the water exit 602 through the water pipe 543. Water repeatedly flows from the water exit 602 and creates a visual effects of a waterfall, which can clean the air blown against the waterfall by a fan 501. Therefore, this embodiment can clean the air, humidify the air, and serve as a decoration.

On the other aspect, a water raising device 711 is provided on the housing 601. A plurality of water scoops (cups) 712 are provided on the water raising device 711, which has one end thereof in the water sub-receptacle 503. When the water raising device 711 is rotated by a motor 713 (this motor 713 can also used for rotating the fan 501), or a motor for rotating the fan 501, the scoops 712 are filled with the water in the water sub-receptacle 503 and rises one by one gradually upwardly toward the top of the water raising device 711, then moves downwardly while having the water in the scoops 712 pour downwardly one by one and creates a waterfall continually. This water can rotate the water wheel 702 and shaft 701 in FIG. 29, or the water wheel 529 and shaft 703. Thus, the decorations on the shaft 701 or 703, or the mechanisms shown in FIGS. 8-28, 38, and 39 and the decorations connected therewith also rotate.

At least a flower support 718 is provided with the housing 601 (FIG. 30) for supporting flowers. The flower support 718 is provided with an opening 719. Therefore, the present invention can clean the air, cool the air, and also provide decorations such as waterfall and flowers. This structure can be used with those shown in FIGS. 8-28.

Figure 31:
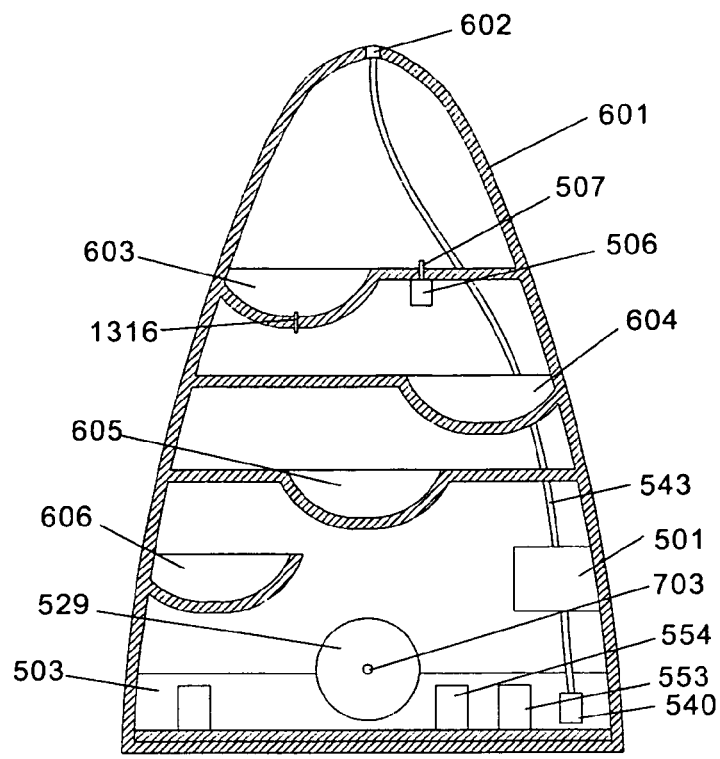
FIG. 31 illustrates yet another embodiment of the present invention, in which the structures of FIGS. 8-28 and 33-39 can also be used with this embodiment.
Figure 32:
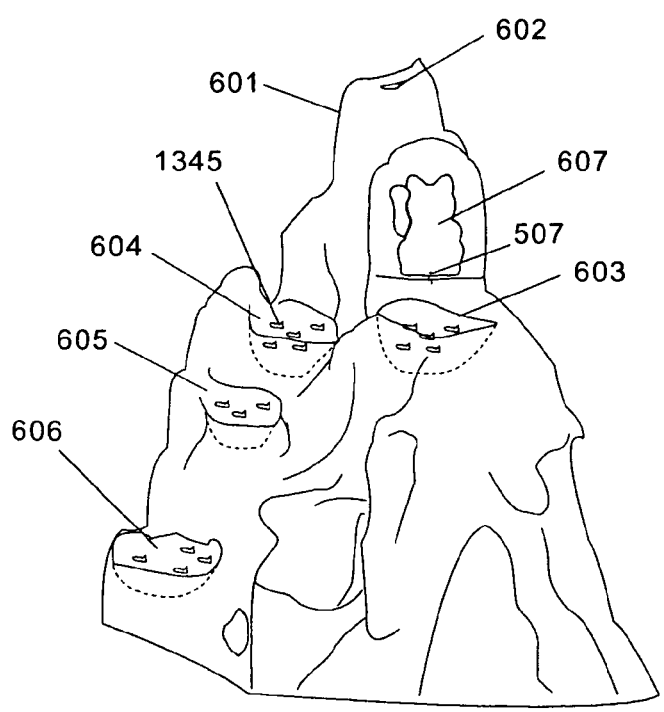
FIG. 32 illustrates a perspective view of embodiment of the present invention in which the structures of FIGS. 8-28 and 33-39 can also be used with this embodiment.
Figure 35:
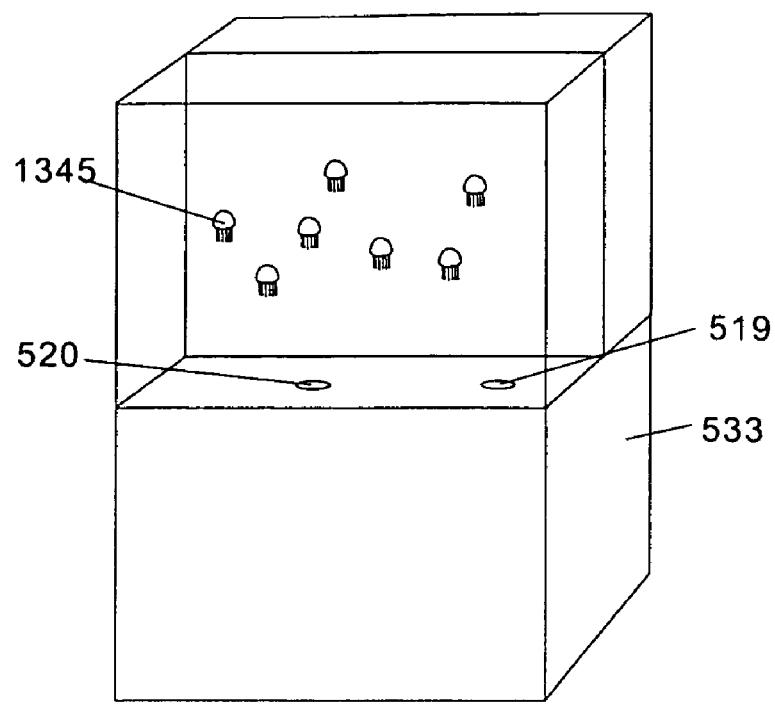
FIG. 35 is an extended mechanism of the present invention, which can also be used with FIGS. 29-34.

FIGS. 31-32 show another embodiment of the present invention. At least one water reservoir 603, 604, 605, and/or 606 is provided on the housing. The water reservoirs 603-606 can be of different forms, e.g. a water receptacle as shown in FIG. 35. As shown in FIG. 31, a motor 506 (can be a motor shared with that for the fan) or a motor for the fan can rotate a shaft 507 or a shaft 1316 inside or outside of the water reservoir 603. Another end of the shaft 507, 1316 can be connected with a decoration directly, or through a mechanism shown in FIGS. 8-28. As shown in FIG. 32, there is a decoration 607 which is similar to that decoration 330 shown in FIGS. 10-11, or the decoration 330 in FIG. 12 can be moved by the shaft 507.

Further to the description of the embodiments or the present invention, a water wheel 529 can be provided in the water sub-receptacle 503. When the decorative humidifier is being used, the fan 501 blows wind toward the waterfall(s) so that the air can be cleaned. The wind will blow toward the water wheel 529 as well, so as to enhance the cleaning of the air. The filter 530 can absorb the impurities in the air. The water pump 540 pumps the water to the water exit 602 on top of the housing 601 through the water pipe 543, so that water flows downwardly to fill up the water reservoir 603 first, then fill up the water reservoirs 604, 605, and 606 one by one, then flows into the water sub-receptacle 503. The water reservoirs 603-606 can be used with the mechanisms shown in FIGS. 29-34 to enhance the decorative effects.

The inventor of the present invention also has the following twelve US patents granted: U.S. Pat. Nos. 5,078,386; 5,088,373; 5,070,753; 5,286,535; 4,890,828; 5,203,743; 4,987,787; 6,978,564, 4,939,944; 5,448,007; 5,081,899; and 5,163,878. These patents can be used with the structures of FIGS. 29-32 of the present invention.

Figure 33:
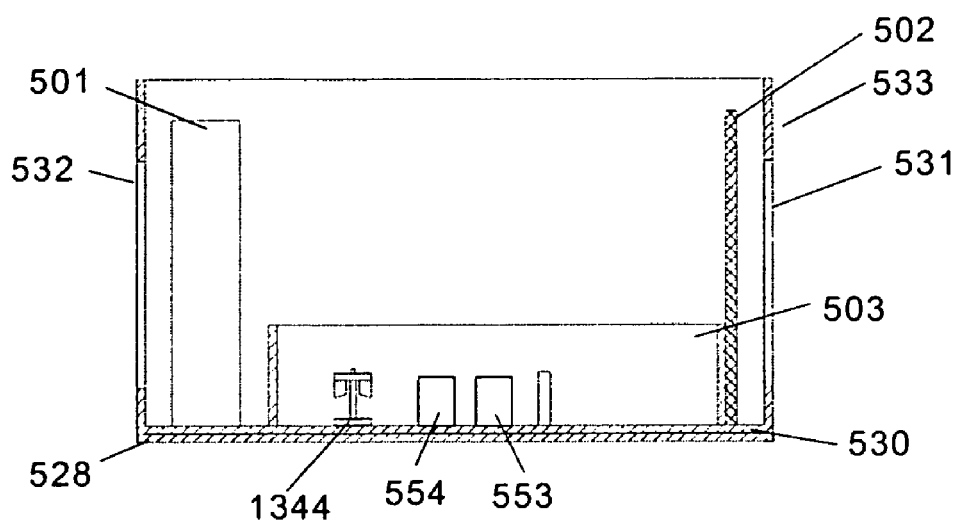
FIG. 33 is a sectional view of a support seat in the present invention.

As shown in FIG. 33, another kind of water sub-receptacle 503 and support seat 533 are illustrated. The support seat 533 is provided with a fan 501, a filter 502, and a water sub-receptacle 503 on the bottom lid 528. A filter 530 is provided on the bottom of the water sub-receptacle 503. A wind exit 532 and a wind inlet 531 are provided on the support seat 533. A fan 501 is provided beside the wind exit 532. The bottom lid 528 and the support seat 533 can be formed integrally. The water sub-receptacle 503 is filled with water. When the power is turned on, the fan 501 blows air inwardly from the wind inlet 531, toward the filter 502, and exits from the wind exit 532 so as to clean the air. The lower end of the filter 502 can be put in the water sub-receptacle so that the filter 502 becomes wet and when the wind is blown through the filter 502, air can be cleaned further and humidified. A bag 553 having ice, air freshener and/or aromatic material and an air cleaning device 554 can be provided in the water sub-receptacle 503 so that the air can be cooled, cleaned, or added with aromatic material.

Figure 34:
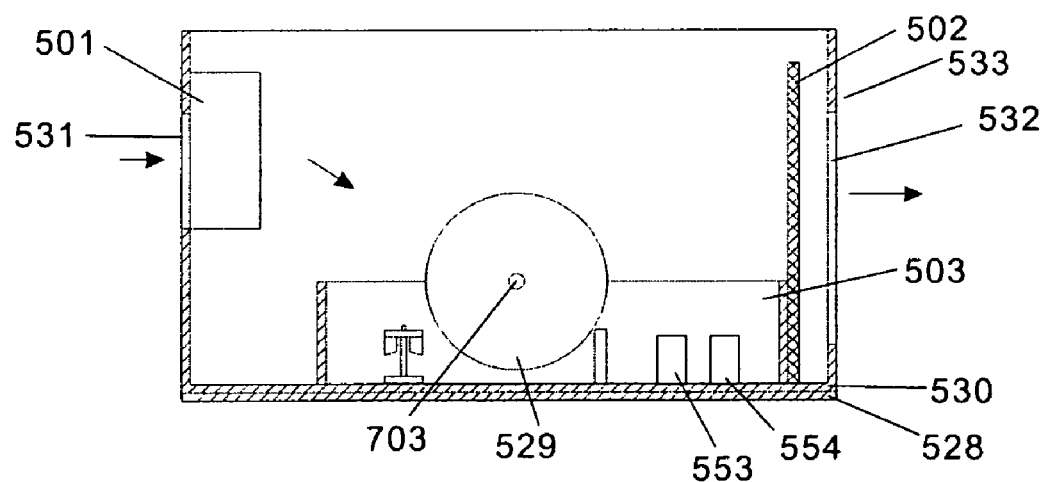
FIG. 34 is a sectional view of a support seat having a single water wheel.

FIG. 34 shows another support seat of the present invention. A water wheel 529 is provided in the water sub-receptacle 503. When the fan 501 is turned on, wind blows from the wind inlet 531, toward the water and water wheel 529 in the water sub-receptacle 503 so that the water wheel 529 rotates and the water in the water sub-receptacle 503 moves, so as to clean the air. A filter 530 is provided in the water sub-receptacle 503 to absorb (or absorb) the impurities in the air, and can be cleaned to remove the impurities. At least one water wheel 529 can be provided. The shaft 703 can be connected to a decoration directly or through a mechanism shown in FIGS. 8-28. A bag 553 having ice, air freshener and/or aromatic material and an air cleaning device 554 can be provided in the water sub-receptacle 503 so that the air can be cooled, cleaned, or added with aromatic material.

An extended mechanism is shown in FIG. 35, a third water exit 520 and a first water inlet 519 are provided on the bottom of a water receptacle which is in turn provided on top of a support seat 533. The water pump 540 is connected to the first water inlet 519. A plurality of decorations 1345 are provided and suspended (floated) in the water receptacle 1315. The decoration 1345 shown here are of the shape of a jelly fish. When the water pump 540 is turned on, water enters the water receptacle 1315 through the first water inlet 519, then enters the support seat 523 (or water sub-receptacle 503 in FIG. 31) through the third water exit 520, so that the water can circulate therein. The water from the third water exit can also flow into other reservoirs 604-606, then into the water sub-receptacle 503 in FIG. 31. The path of the water flow can be varied to enhance the air cleaning and decoration effects. The decorations 1345 moved with the water to impart in the decoration. A light not shown in the figures can also be provided. Thus the air can be cleaned, humidified, and the humidifier can provide visual effects. This mechanism can also be used with those shown in FIGS. 29-34.

The water reservoirs 603-606 and the water sub-receptacle 503 can have various shapes or arrangements.

Figure 36:
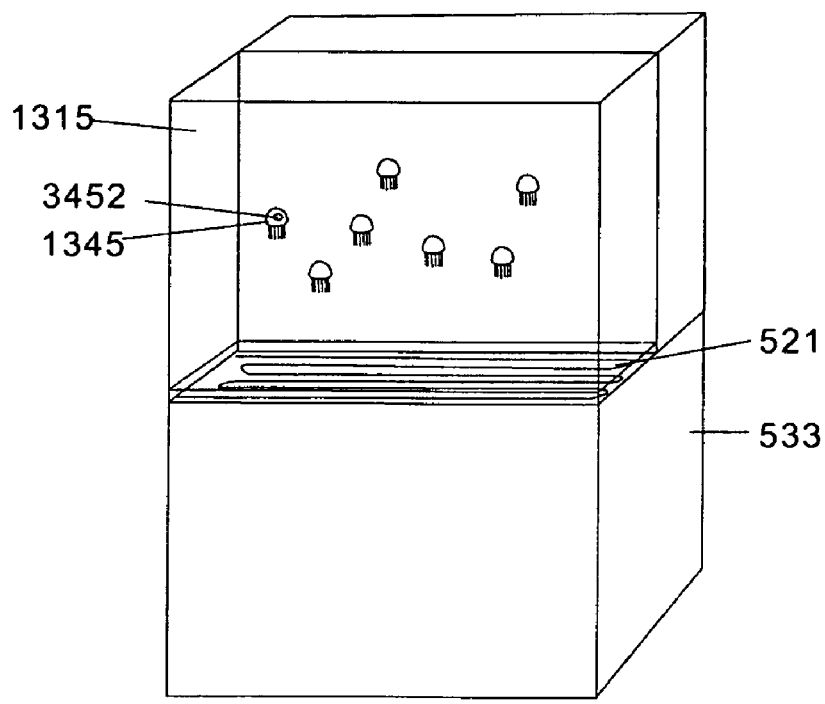
FIG. 36 is another extended mechanism of the present invention, which can also be used with FIGS. 1-5 and 29-34.

FIG. 36 shows another extended mechanism, which can be put into the water receptacle 315 in FIGS. 1-5, the water reservoir 603 in FIGS. 29-32, or the water sub-receptacle 503. A first magnetic device 521 is provided on the bottom of the water receptacle 1315. A plurality of decorations 1345 are provided and are suspended (floated) in the water receptacle 1315. The decorations are provided with a second magnetic device 3452 respectively. When the first magnet device 521 is energized, the magnetic force thereof exerts a pushing force against the second magnetic devices 3452 (because of same polarity therewith) in the decorations 1345, so that the decorations 1345 are prevented from sinking to the bottom of the water receptacle 1315, and can move around in the water receptacle 1315. Each of the decorations are of different weights and therefore will move around at different heights in the water receptacle 1315. This mechanism can be used in FIGS. 1-5 and 29-34.

Figure 37:
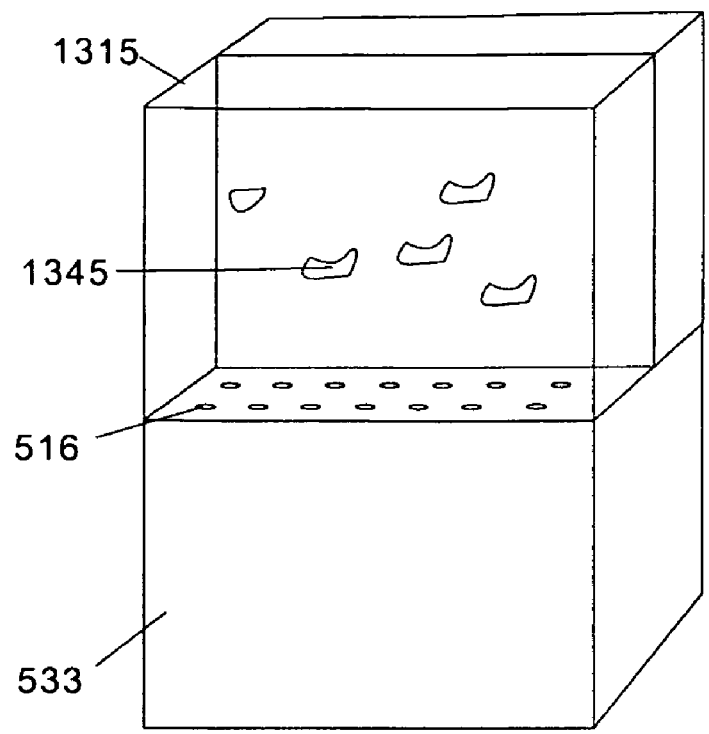
FIG. 37 is another extended mechanism of the present invention, which can also be used with FIGS. 29-34.

FIG. 37 shows yet another extended mechanism, which can also be put into the water reservoir 603 or the water sub-receptacle 503. A plurality of second holes 516 are provided on the bottom or the water receptacle 1315 and are connected to the water pump 540. A plurality of decorations 1345 are provided and floated (suspended) in the water receptacle 1315. When the water pump 540 pumps the water, the water can flow upwardly through the second holes 516 so that the decorations (fish shown in the FIG. 37) can float and then sink due to the weight itself. If a rock having holes are provided after the second holes or the water pump 540 in the water flow path, a lot of bubbles can be formed in the water flow path to enhance the decoration effects. A light can also be provided (not shown in the drawing) to enhance it.

Figure 38:
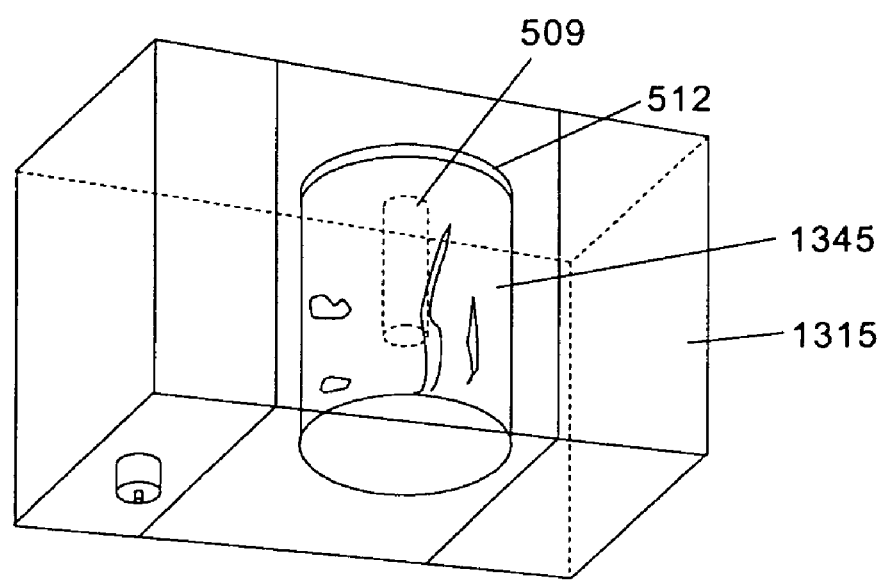
FIG. 38 is another extended mechanism of the present invention, which can also be used with FIGS. 1-5 and 29-34.
Figure 39:
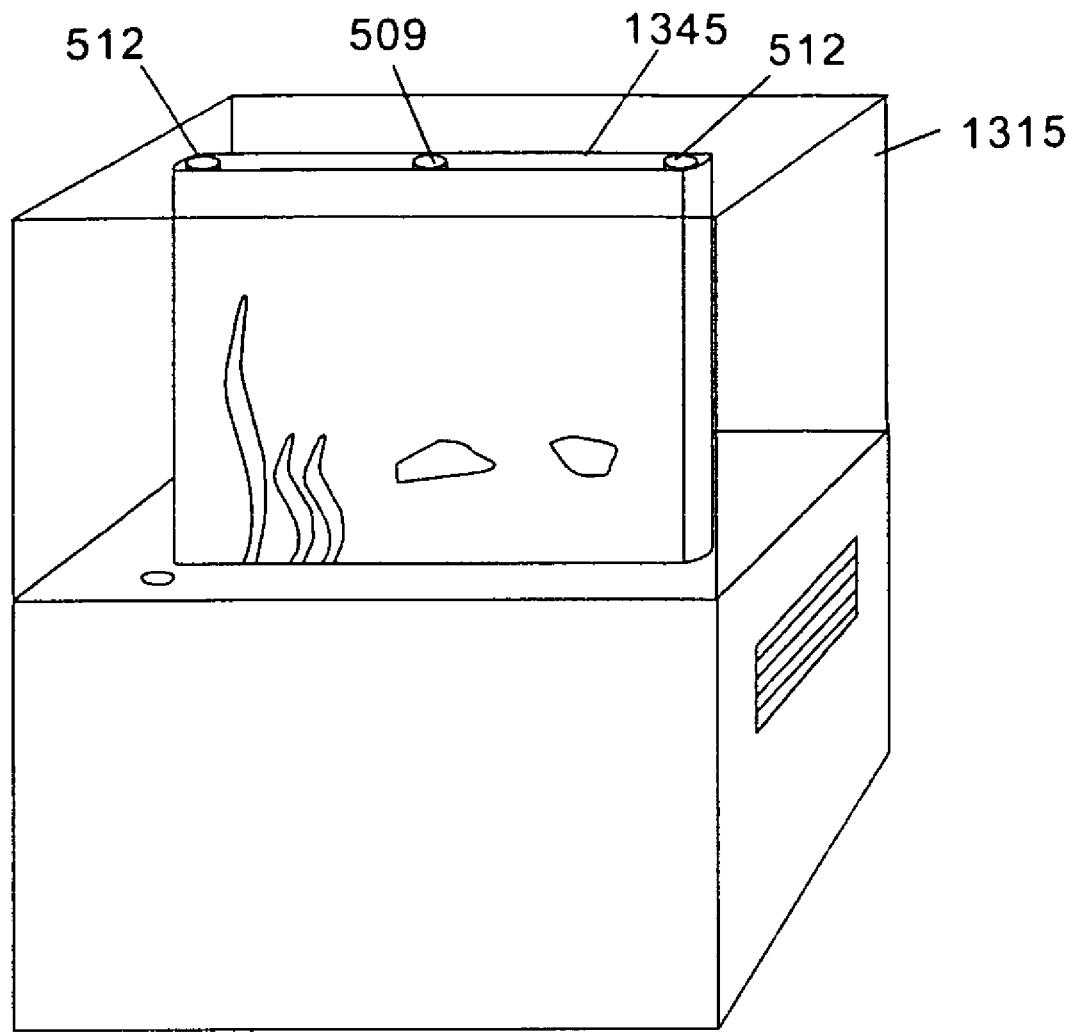
FIG. 39 is another extended mechanism of the present invention, which can also be used with FIGS. 1-5 and 29-34.

Other two extended mechanisms are shown in FIGS. 38-39, which can be put inside or outside of the water receptacle 315 in FIGS. 1-5, or in the water reservoir 603 or water sub-receptacle 503 in FIGS. 29-31, or on the housing 601. As shown in FIG. 38, a light 509 is provided in the transparent water receptacle 1315. A decoration 1345 is provided outside of the light 509. A transmission mechanism 512 which can be connected to a shaft 1316 in FIG. 31, or shaft 307 and/or 316 in FIG. 3, is provided with the decoration 1345. When this embodiment is being used, the light 509 illuminates the pictures on the decoration 1345 which is moved (rotated) by the shaft 1316, 307 and/or 316 through the transmission mechanism 512 to enhance the visual effects.

FIG. 39 shows an embodiment different from that shown in FIG. 38. A light 509 is provided in the transparent water receptacle 1315. A decoration 1345 is provided outside of the light 509. A transmission mechanism 512 (in the form of two rollers, in which one roller can be connected to a shaft 1316 in FIG. 31, or shaft 307 and/or 316 in FIG. 3) is provided on the two sides of the decoration 1345. When this embodiment is being used, the light 509 illuminates the pictures on the decoration 1345 which is moved (rotated) by the shaft 1316, 307 and/or 316 through the transmission mechanism 512 to enhance the visual effects.

The foregoing description is provided for illustrative purposes only and should not be construed as any way limiting this invention, the scope of which is defined solely by the appended claims.

The invention claimed is:

1. A waterfall decorative humidifier, including mainly a housing, a water exit on top of the housing, a water sub-receptacle in the lower portion of the housing, a water pump in the Water sub-receptacle, and a fan in the housing; in which the water pump is connected with the water exit through a water pipe, and in which the housing is generally of the shape of a waterfall; wherein at least one shaft is provided on the housing, and a decoration is connected to the shaft directly Or through a mechanism.

2. A waterfall decorative humidifier, including mainly a housing, a water exit on top of the housing, a water sub-receptacle in the lower portion of the housing, a water pump in the water sub-receptacle, a fan in the housing; in which the housing is generally of the shape of a waterfall and in which at least one heating sheet is provided in the housing.

3. The waterfall decorative humidifier as claim 1, in which at least one gear is connected to the shaft, and at least one decoration is connected to the gear directly or through a mechanism.

4. The waterfall decorative humidifier as claim 1, in which at least one conveyor belt is connected to the shaft, and in which at least one decoration is connected to the conveyor belt directly or through a mechanism.

5. The waterfall decorative humidifier as claim 1, in which at least one eccentric wheel is connected to the shaft, and in which at least one decoration is connected to the eccentric wheel directly or through a mechanism.

6. The waterfall decorative humidifier as claim 1, in which the housing is provided with at least one flower support.

7. The waterfall decorative humidifier as claim 1, in which at least one water exit and one water inlet are provided, and the water pump is connected to the first water inlet.

8. The waterfall decorative humidifier as claim 1, in which a plurality of second holes are provided and are connected to the water pump.

9. The waterfall decorative humidifier as claim 2, further including a water raising device having at least one water scoop.

10. A waterfall decorative humidifier, including mainly a housing, a water sub-receptacle in the lower portion of the housing, and a water pump in the water sub-receptacle; in which the water pump is connected to the water exit through a water pipe; in which the housing is generally of the shape of a waterfall; and in which the housing is provided with at least one magnetic device.

11. The waterfall decorative humidifier as claim 10, further including at least one water reservoir, and at least one decoration provided in the water sub-receptacle or the water reservoir and is floated therein.

12. A waterfall decorative humidifier, including mainly a housing, a water sub-receptacle in the lower portion of the housing, a water raising device provided on the housing, at least one scoop provided on the water raising device, and a fan provided on the housing; in which the housing is generally of the shape of a waterfall.

13. A waterfall decorative humidifier, including mainly a housing, a water exit on top of the housing, a water sub-receptacle in the lower portion of the housing, a water pump in the water sub-receptacle, and a fan in the housing; in which the housing is generally of the shape of a waterfall, and in which the housing is provided with at least one magnetic device.

14. A waterfall decorative humidifier, including mainly a housing, a water sub-receptacle in the lower portion of the housing, and a water pump in the water sub-receptacle; in which the housing is generally of the shape of a waterfall; and in which at least one shaft is provided on the housing, and in which at least one decoration is connected directly to the shaft, or through a mechanism.

15. A waterfall decorative humidifier, including mainly a housing, a water exit on top of the housing, a water sub-receptacle in the lower portion of the housing, a water pump in the water sub-receptacle, and a fan in the housing; in which the housing is generally of the shape of a waterfall and in which at least one water wheel is provided in the water sub-receptacle.

* * * * *